(12) United States Patent
Cho et al.

(10) Patent No.: US 11,067,819 B2
(45) Date of Patent: Jul. 20, 2021

(54) OPTICAL DEVICE AND METHOD OF DRIVING THE SAME

(71) Applicant: Samsung Display Co., Ltd., Yongin-si (KR)

(72) Inventors: Hyun Jin Cho, Seoul (KR); Jae Joong Kwon, Suwon-si (KR); Ju Hwa Ha, Seoul (KR); Jeong Woo Park, Yongin-si (KR); Su Bin Jung, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 239 days.

(21) Appl. No.: 16/420,058

(22) Filed: May 22, 2019

(65) Prior Publication Data

US 2020/0026093 A1  Jan. 23, 2020

(30) Foreign Application Priority Data

Jul. 17, 2018 (KR) ........................ 10-2018-0082872

(51) Int. Cl.
*G02B 27/28* (2006.01)
*G02F 1/137* (2006.01)
*G02B 27/01* (2006.01)

(52) U.S. Cl.
CPC ....... *G02B 27/283* (2013.01); *G02B 27/0172* (2013.01); *G02F 1/137* (2013.01)

(58) Field of Classification Search
CPC .... G20B 27/283; G20B 27/0172; G02F 1/137

USPC ........................................................... 349/11
See application file for complete search history.

(56) References Cited

U.S. PATENT DOCUMENTS

| 9,761,051 B2 | 9/2017 | Bromer | |
|---|---|---|---|
| 2010/0149073 A1 | 6/2010 | Chaum et al. | |
| 2015/0219911 A1* | 8/2015 | Cho | H04N 13/305 349/15 |
| 2016/0077351 A1* | 3/2016 | Iwane | G02B 17/002 349/15 |

FOREIGN PATENT DOCUMENTS

| KR | 10-1660519 B1 | 9/2016 |
|---|---|---|
| KR | 10-1830364 B1 | 2/2018 |

* cited by examiner

*Primary Examiner* — Nathanael R Briggs
*Assistant Examiner* — William D Peterson
(74) *Attorney, Agent, or Firm* — Lewis Roca Rothgerber Christie LLP

(57) ABSTRACT

A optical device includes: a display device configured to output a display image; a lens on one side of the display device; and a polarization control unit between the display device and the lens and configured to output the display image output from the display device as first polarized light or second polarized light, wherein the lens comprises: a first polarizing mirror configured to reflect a display image of the first polarized light and to transmit a display image of the second polarized light; and a second polarizing mirror configured to reflect a display image of the second polarized light and to transmit a display image of the first polarized light.

20 Claims, 27 Drawing Sheets

OPTICAL DEVICE AND METHOD OF DRIVING THE SAME

CROSS-REFERENCE TO RELATED APPLICATION

This application claims priority to and the benefit of Korean Patent Application No. 10-2018-0082872, filed on Jul. 17, 2018, in the Korean Intellectual Property Office, the disclosure of which is incorporated herein by reference in its entirety.

BACKGROUND

1. Field

Aspects of some example embodiments of the present invention relate to a optical device and a method of driving the same.

2. Description of the Related Art

An augmented reality refers to a technique of superimposing a virtual image on an image of reality seen by user's eyes and displaying a single image. A virtual image may be an image in the form of a text or graphic, and an actual image may be information about an actual object observed in the field of view of an apparatus.

The augmented reality may be realized using, for example, a head-mounted display (HMD), a head-up display (HUD), or the like. When the augmented reality is realized using a head-mounted display, it may be provided in the form of eye glasses such that a user can easily carry it as well as easily put it on or take it off. In this case, a display device providing a virtual image for realizing an augmented reality is implemented using a microdisplay such as OLEDoS (Organic Light Emitting Diode on Silicon) or LCOS (Liquid Crystal on Silicon).

Recently, there has been a demand to enlarge an area of a display device, that is, a field of view (FOV) of a user, which is visible to the user. In this case, a plurality of microdisplays is required.

The information disclosed in this Background section is for the purposes of providing context to the disclosure of the present invention, and the information does not necessarily constitute prior art.

SUMMARY

Aspects of some example embodiments of the present invention include a optical device capable of enlarging an area of a display device, that is, a field of view (FOV) of a user, which is visible to the user, while using one display.

Aspects of some example embodiments of the present invention may further include a method of driving an augmented providing device capable of enlarging an area of a display device, that is, a field of view (FOV) of a user, which is visible to the user, while using one display.

According to some example embodiments of the present disclosure, an augmented reality device includes: a display device outputting a display image; a lens on one side of the display device; and a polarization control unit between the display device and the lens and outputting the display image output from the display device as first polarized light or second polarized light, wherein the lens comprises: a first polarizing mirror is configured to reflect a display image of the first polarized light and transmitting a display image of the second polarized light; and a second polarizing mirror is configured to reflect a display image of the second polarized light and transmitting a display image of the first polarized light.

According to another aspect of the present disclosure, there is provided a method of driving a optical device, comprising: displaying first and second images on first and second areas of a display device during a first period, respectively; outputting the first and second images as first polarized light during the first period; reflecting a first image of the first polarized light through a first polarizing mirror during the first period; displaying the first and second images on the first and second areas of the display device during a second period, respectively; outputting the first and second images as second polarized light during the second period; and reflecting a second image of the second polarized light through a second polarizing mirror during the second period.

According to another aspect of the present disclosure, there is provided a method of driving a optical device, comprising: displaying a first image on a first area of a display device during a first period; outputting the first image as first polarized light during the first period; reflecting a first image of the first polarized light through a first polarizing mirror during the first period; displaying a fifth image on the first area of the display device during a second period; outputting the fifth image as second polarized light during the second period; and reflecting a fifth image of the second polarized light through a second polarizing mirror during the second period.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of some example embodiments of the present invention will become more apparent by describing in more detail aspects of some example embodiments thereof with reference to the attached drawings, in which.

DETAILED DESCRIPTION

Aspects of some example embodiments of the present invention will now be described more fully hereinafter with reference to the accompanying drawings, in which some example embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Hereinafter, aspects of some example embodiments of the present invention will be described with reference to the attached drawings.

Figure 1:
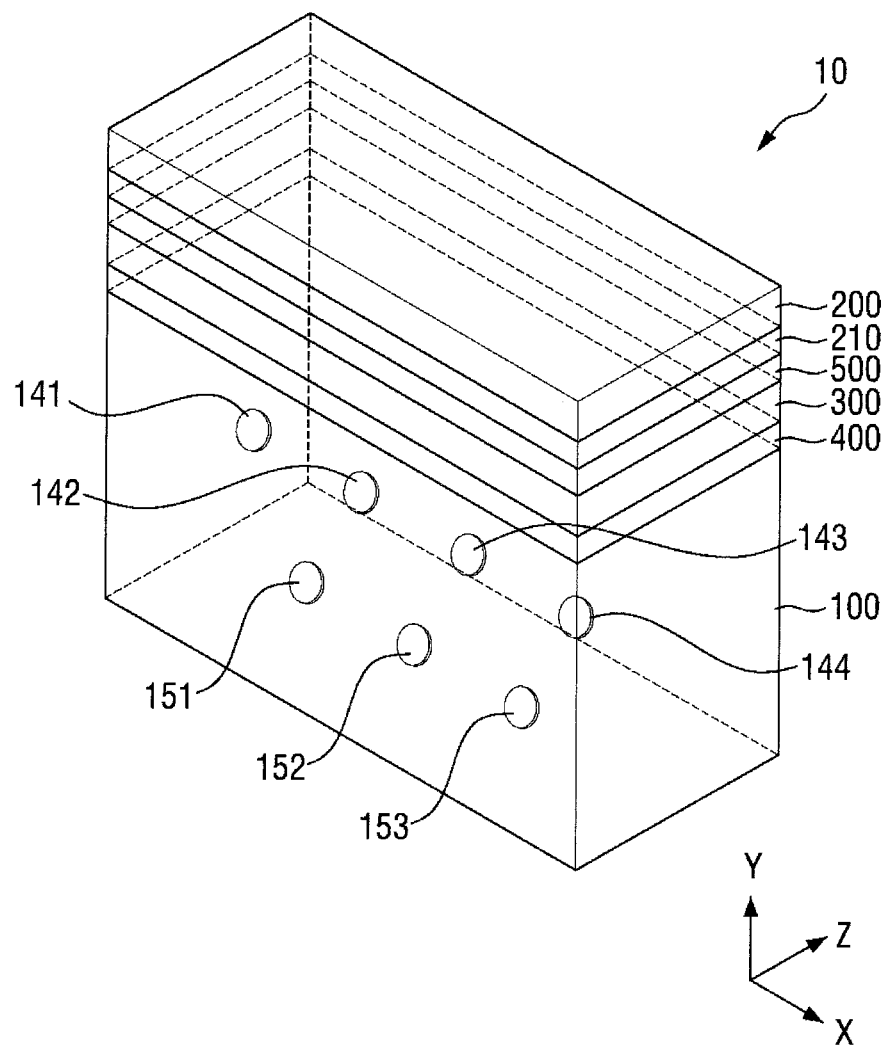
FIG. 1 is a perspective view of a optical device according to some example embodiments.

FIG. 1 is a perspective view of a optical device (or augmented reality device) according to some example embodiments.

Referring to FIG. 1, a optical device (or augmented reality device) 10 according to some example embodiments includes a lens 100, a display device 200, a polarization plate 210, a polarization control unit 300, a first adhesive layer 400, and a second adhesive layer 500.

The lens 100 may be formed of glass or plastic in a transparent or translucent manner. Thus, a user may see an image of reality (e.g., an external environment) through the lens 100. The lens 100 may have a refractive power (e.g., a predetermined refractive power) in consideration of the visual acuity of the user.

Figure 12:
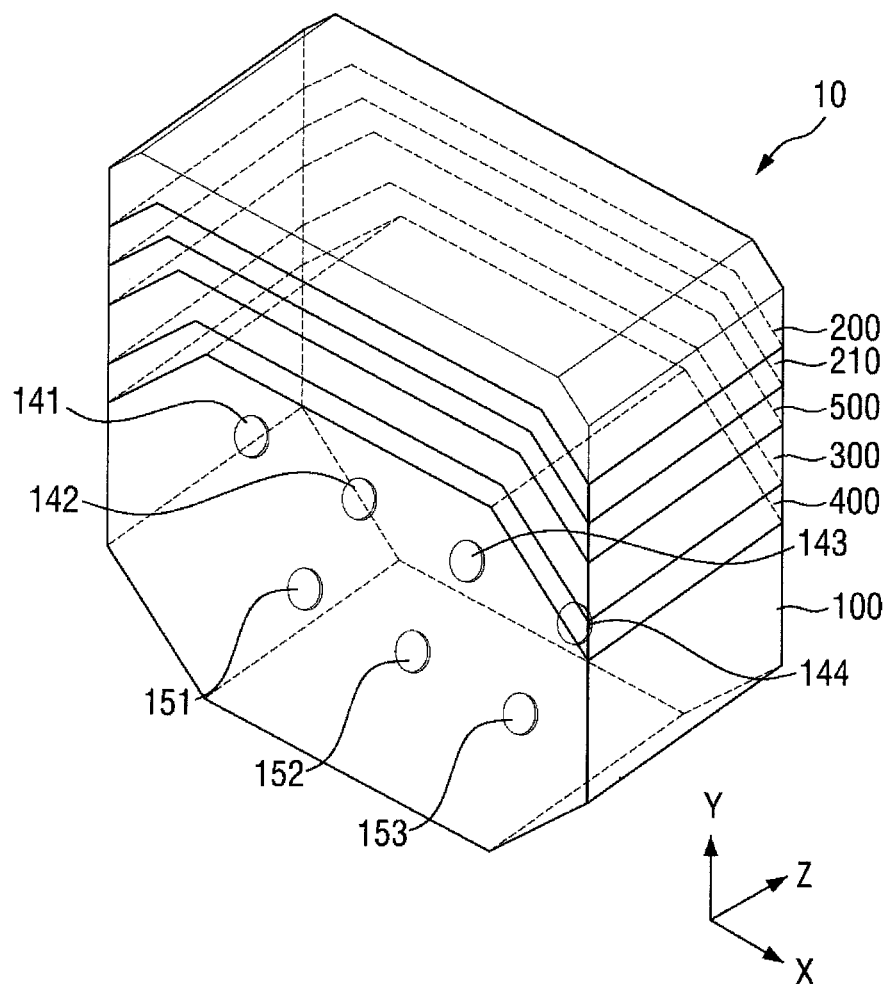
FIG. 12 is a perspective view of a optical device according to some example embodiments.
Figure 13:
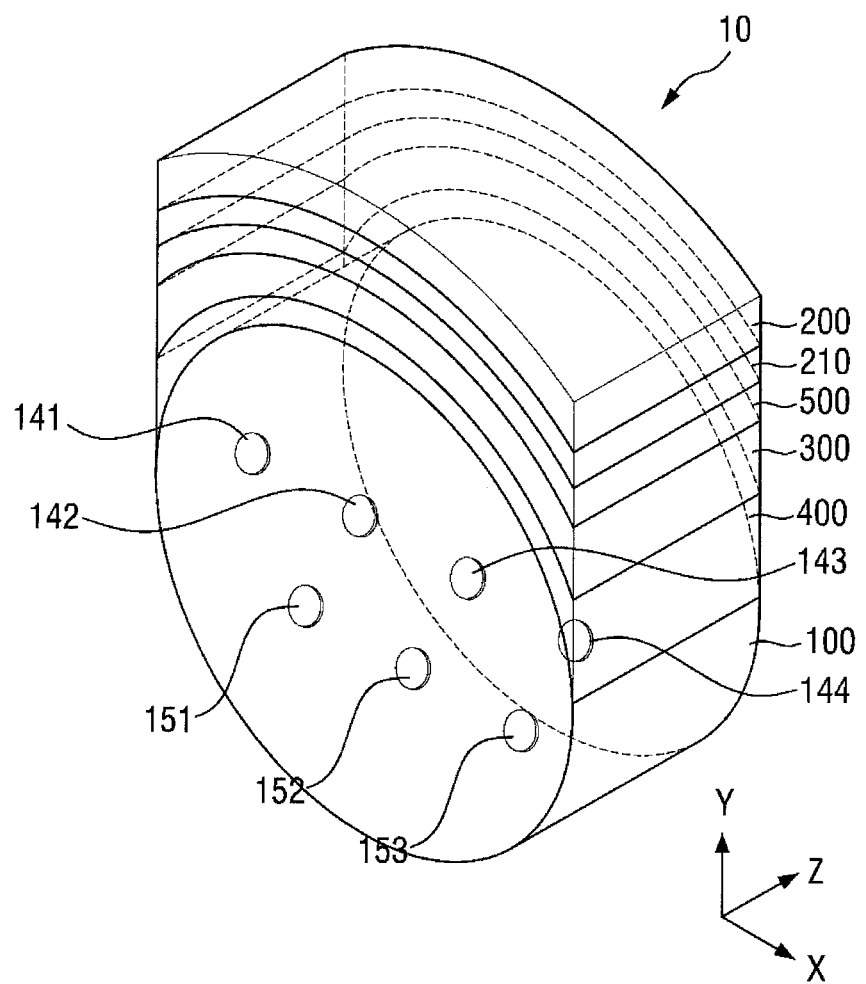
FIG. 13 is a perspective view of a optical device according to some example embodiments.
Figure 14:
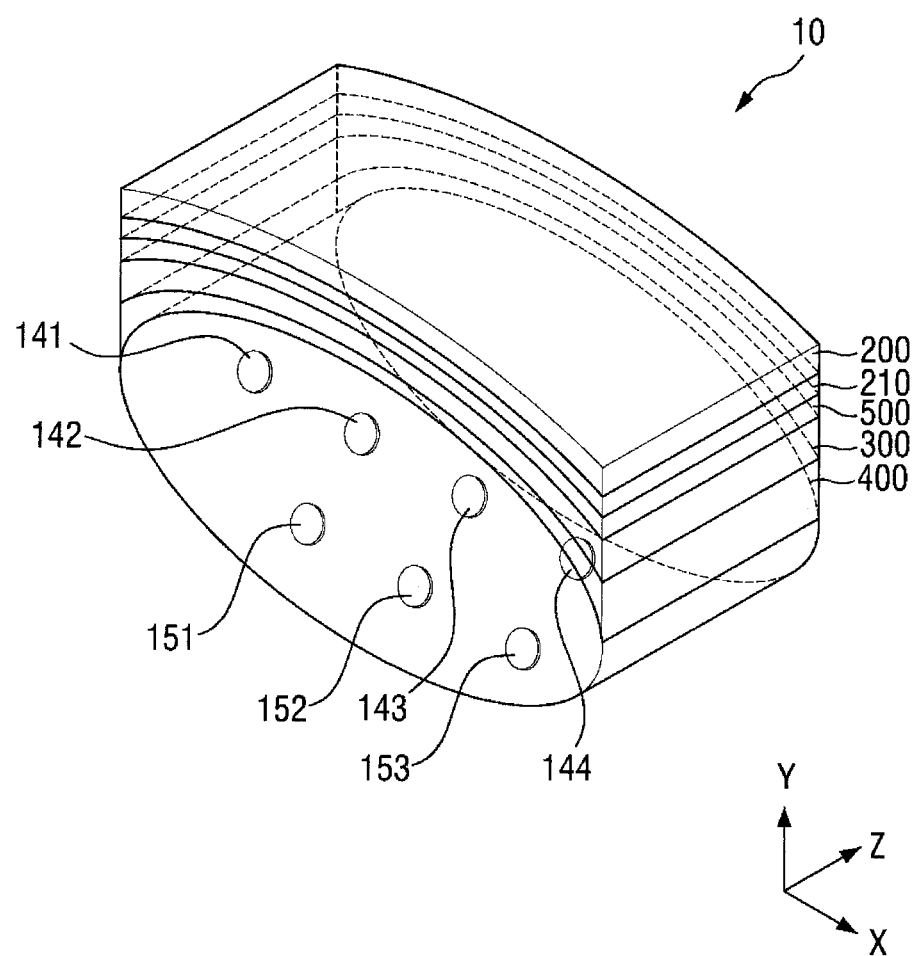
FIG. 14 is a perspective view of a optical device according to some example embodiments.

As shown in FIG. 1, the lens 100 may be formed in a hexahedron having first and second rectangular surfaces and first to fourth side surfaces. However, the lens 100 may be formed in various other shapes. For example, the lens 100 may be formed in a decahedron having first and second octagonal surfaces and first to eighth side surfaces. That is, the lens 100 according to an embodiment may be formed in a polyhedron having first and second polygonal surfaces and side surfaces. Further, as shown in FIG. 13, the lens 100 may be formed in a cylinder having first and second circular surfaces and a side surface. Further, as shown in FIG. 14, the lens 100 may be formed in a cylinder having first and second elliptical surfaces and a side surface. In FIGS. 1 and 12 to 14, the first surface may be defined as a surface on which the user's eye is located (e.g., a surface closest to, or facing, the user's eye), and the second surface may be defined as an outer surface (e.g., a surface facing away from the user's eye) of the lens 100. The lens 100 may be formed in other shapes such as an elliptical cylinder, a semicircular cylinder, a semi-elliptic cylinder, a distorted cylinder, or a distorted semicircular cylinder in addition to the polyhedron and cylindrical shapes shown in FIGS. 1 and 12 to 14.

The lens 100 includes first polarizing mirrors 141, 142, 143, 144 and second polarizing mirrors 151, 152, 153. Although it is illustrated in FIG. 1 that the lens 100 includes a plurality of first polarizing mirrors and a plurality of second polarizing mirrors, the lens 100 may include only one first polarizing mirror and only one second polarizing mirror. However, in order to enlarge an area of a display device 200, that is, a field of view (FOV), the lens 100 may include a plurality of first polarizing mirrors and a plurality of second polarizing mirrors.

Each of the first polarizing mirrors 141, 142, 143, and 144 may be, for example, a reflective polarizing film that reflects first polarized light and transmits second polarized light, and each of the second polarizing mirrors 151, 152, and 153 may be a reflective polarizing film that reflects second polarized light and transmits first polarized light. The reflective polarizing film may be a reflective linear polarizer, for example, a dual brightness enhancement film (DBEF) commercially available from 3M Corporation in U.S.A.

Here, the first polarized light may be any one of s-polarized light (vertical polarized light) and p-polarized (horizontal polarized light), and the second polarized light may be the other one thereof. Hereinafter, for convenience of explanation, it is assumed that the first polarized light is p-polarized light (horizontal polarized light) and the second polarized light is s-polarized light (vertical polarized light).

The first polarizing mirrors 141, 142, 143, and 144 and the second polarizing mirrors 151, 152, and 153 reflect a virtual image displayed on the display device 200 and provide the virtual image to the user's eyes. Because the virtual image displayed on the display device 200 is reflected by the first polarizing mirrors 141, 142, 143, and 144 and the second polarizing mirrors 151, 152, and 153, the depth of field increases. In particular, the first polarizing mirrors 141, 142, 143, and 144 and the second polarizing mirrors 151, 152, and 153 concatenate the virtual image displayed by the display device 200 at a point on the retina of the user's eye. Thus, even if the user focuses on a real image through the lens 100, a virtual image may be clearly seen. That is, even if the user does not shift the focus on the real image, the virtual image can be clearly seen.

The size of each of the first polarizing mirrors 141, 142, 143, 144 and the second polarizing mirrors 151, 152, 153 may be smaller than the size of the pupil. For example, each of the first polarizing mirrors 141, 142, 143, 144 and the second polarizing mirrors 151, 152, 153 may have a diameter of about 4 mm. In this case, because a user focuses on the real image, it is difficult for the user to recognize the first polarizing mirrors 141, 142, 143, 144 and the second polarizing mirrors 151, 152, 153, 154. However, as the sizes of the first polarizing mirrors 141, 142, 143, 144 and the second polarizing mirrors 151, 152, 153 are reduced, the brightness of the virtual image provided to the user's eyes is also reduced by the display device 200, so that the sizes of the first polarizing mirrors 141, 142, 143, and 144 and the second polarizing mirrors 151, 152, and 153 may be set in consideration thereof. Although it is illustrated in FIG. 1 that the first polarizing mirrors 141, 142, 143, and 144 and the second polarizing mirrors 151, 152, and 153 has a circular cross section, they may have an elliptical or polygonal cross section in addition to the circular cross section.

Any one of the first polarizing mirrors 141, 142, 143, and 144 and any one of the second polarizing mirrors 151, 152, and 153 are not located in parallel in the height direction of the lens 100 (Y-axis direction, hereinafter referred to as "first direction"), the width direction of the lens 100 (X-axis direction, hereinafter referred to as "second direction"), and the thickness direction of the lens (Z-axis direction, hereinafter referred to as "third direction"). The first polarizing mirrors 141, 142, 143, and 144 may be spaced apart from each other by a distance (e.g., a predetermined distance) and arranged in parallel in the second direction (X-axis direction). The second polarizing mirrors 151, 152, and 153 may also be spaced apart from each other by a distance (e.g., a predetermined distance) and arranged in the second direction (X-axis direction).

Figure 2:
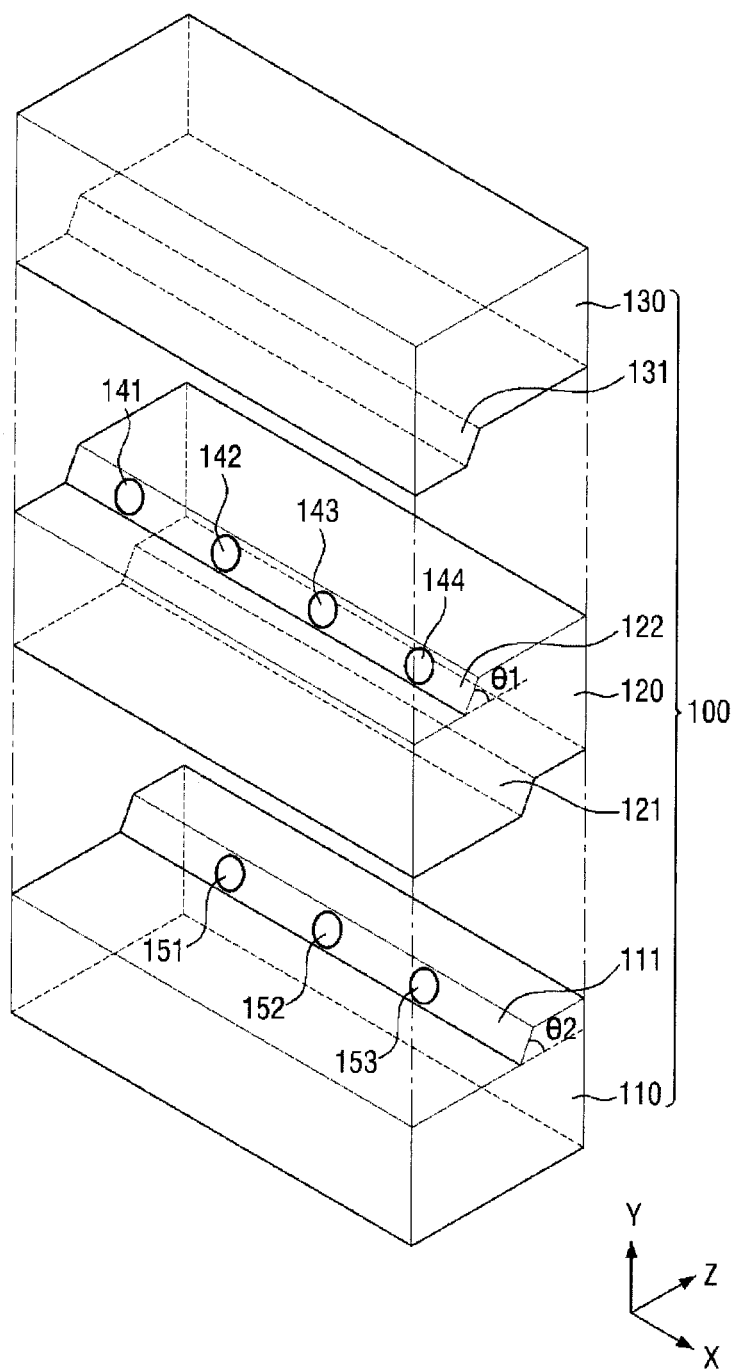
FIG. 2 is a perspective view showing an example of a lens including first and second polarization mirrors of FIG. 1.
Figure 4:
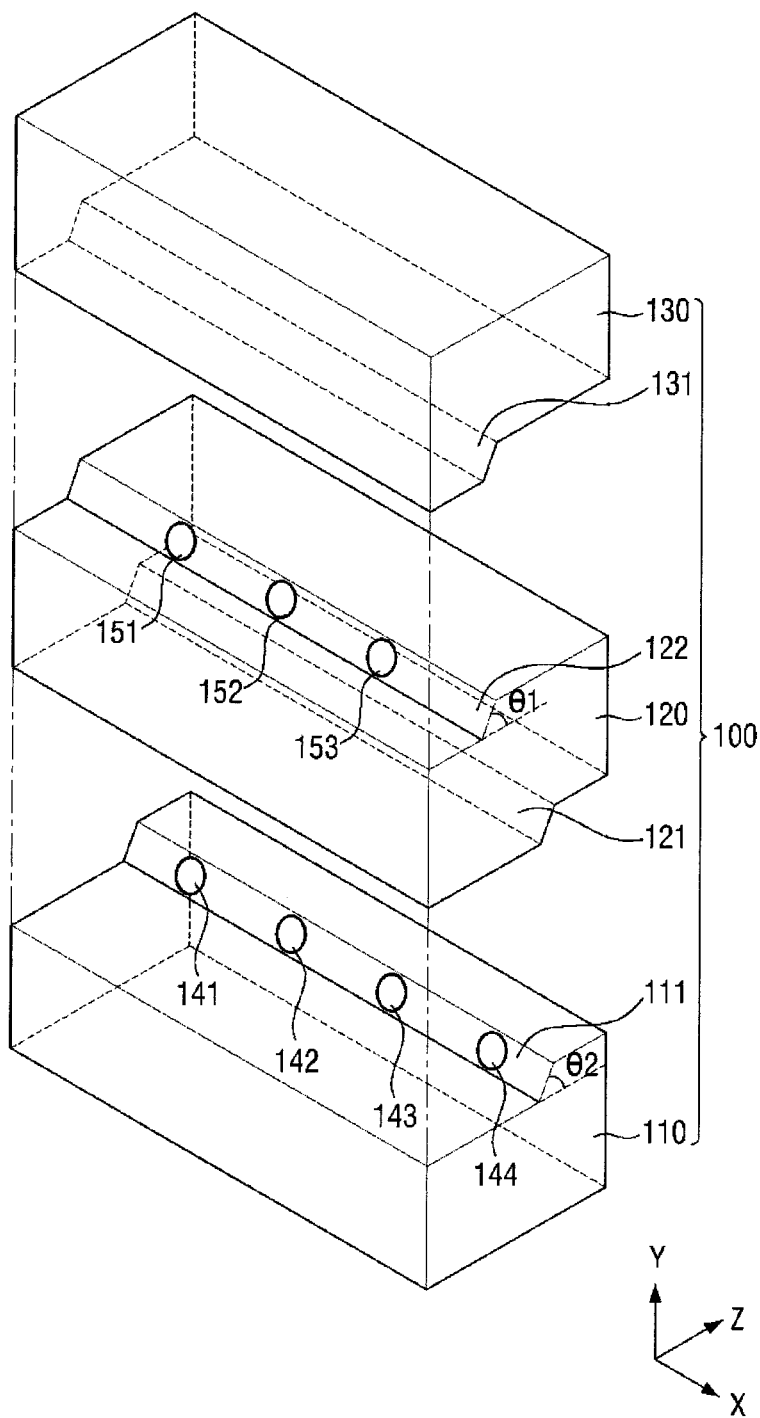
FIG. 4 is a perspective view showing another example of a lens including first and second polarization mirrors of FIG. 1.

As shown in FIGS. 2 and 4, the lens 100 may include a plurality of lens units 110, 120, and 130. The upper surface of the first lens unit 110 may include a first inclined surface 111 and may be formed in a stepped shape. The second polarizing mirrors 151, 152, and 153 may be located on the first inclined surface 111 to be inclined at a second angle $\theta 2$. The second angle $\theta 2$ may be appropriately set according to the display device 200, the second polarizing mirror 151/152/153, and the angle formed by the user's eye. The lower surface of the first lens unit 110 may be flat.

Figure 9A:
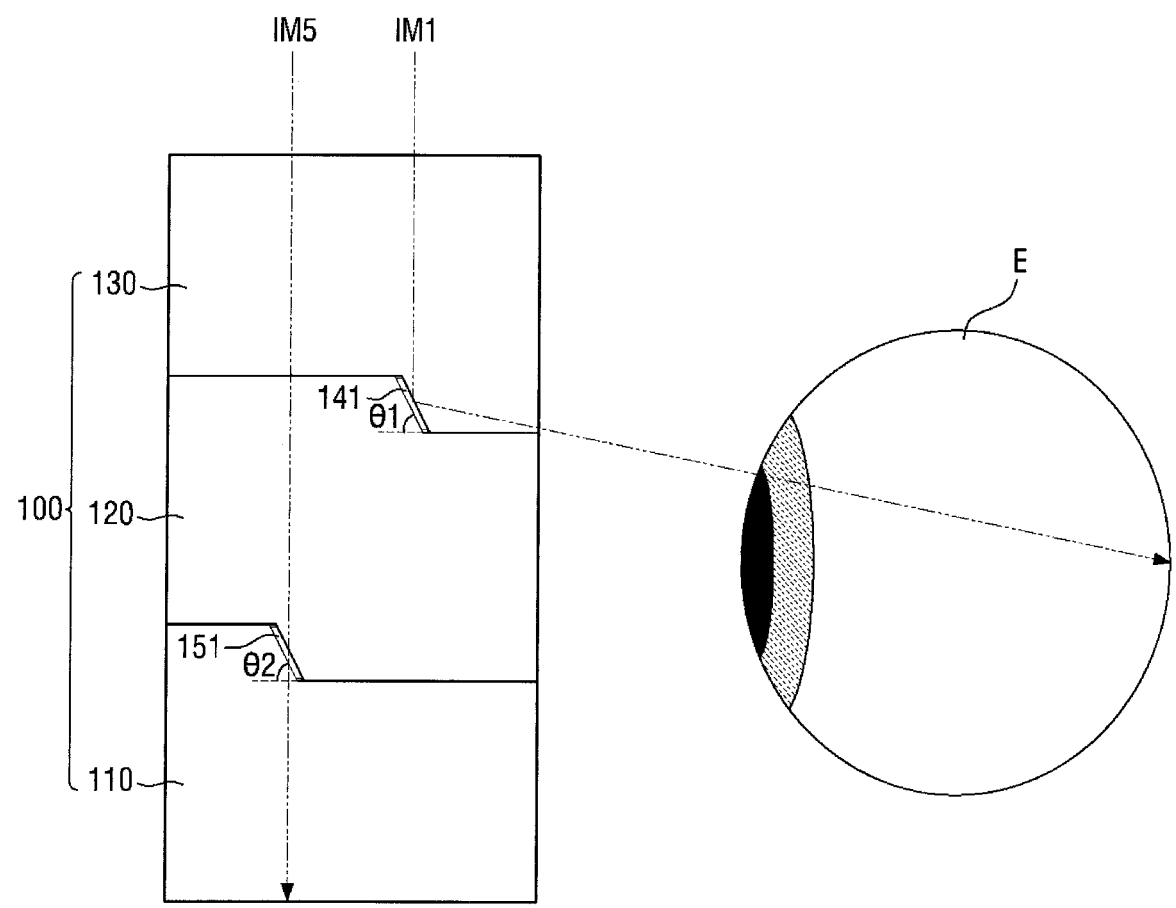
FIGS. 9A and 9B are side views showing an example of a lens for explaining a driving method during first and second periods of FIG. 7.
Figure 9B:
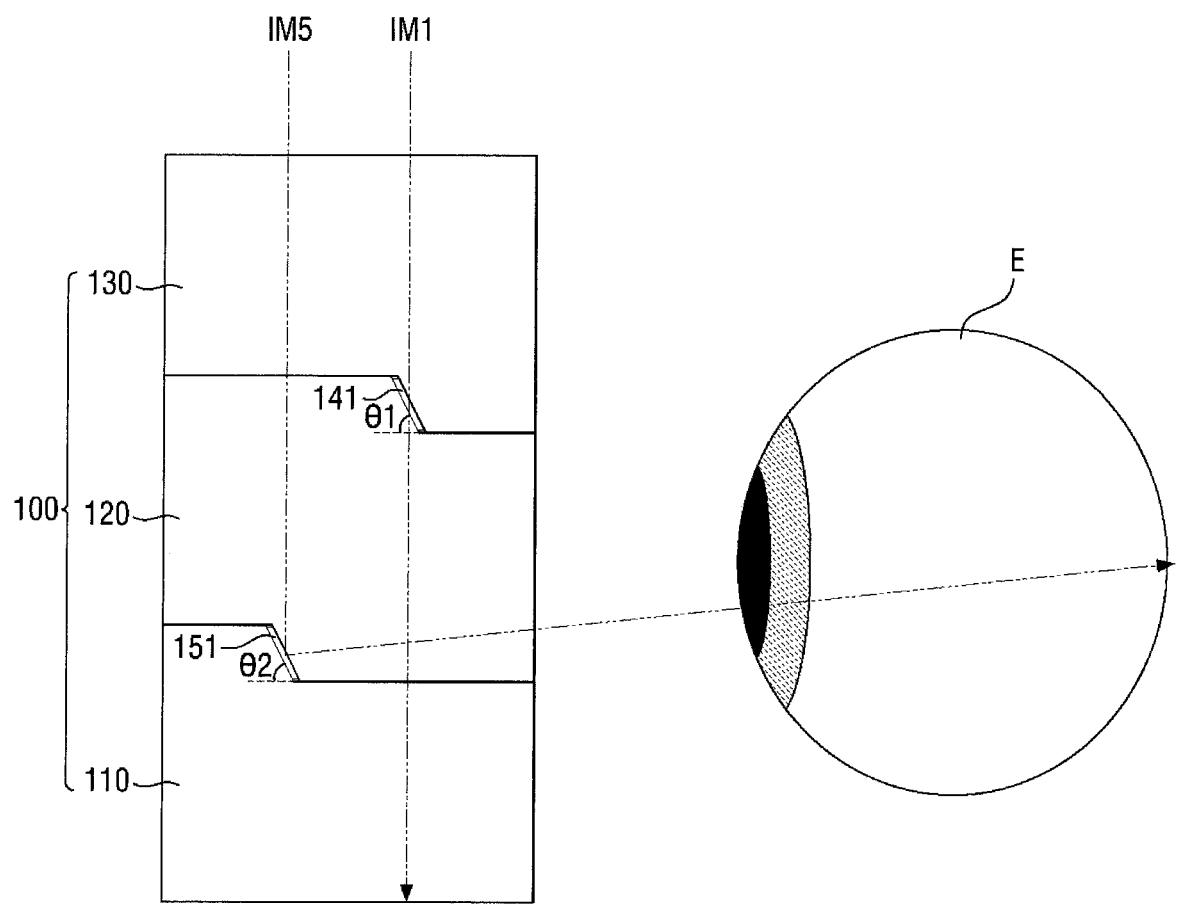

The second lens unit 120 is located on the first lens unit 110. The lower surface of the second lens unit 120 may have a stepped shape corresponding to the stepped shape of the upper surface of the first lens unit 110. The lower surface of the second lens unit 120 may include a second inclined surface 121 and may be formed in a stepped shape, and the second inclined surface 121 may have substantially the same inclination as the first inclined surface 111. The upper surface of the second lens unit 120 may include a third inclined surface 122 and may be formed in a stepped shape. The first polarizing mirrors 141, 142, 143, and 144 may be located on the third inclined surface 122 to be inclined at a first angle $\theta 1$. The first angle $\theta 1$ may be appropriately set according to the display device 200, the first polarizing mirror 151/152/153, and the angle formed by the user's eye. For example, as shown in FIGS. 9A and 9B, the inclined angle $\theta 1$ of the first polarizing mirror 141/142/143/144 may be larger than the inclined angle $\theta 2$ of the second polarizing mirror 151/152/153/154.

The inclined angle $\theta 1$ of the first polarizing mirror 141/142/143/144 and the inclined angle $\theta 2$ of the second polarizing mirror 151/152/153/154 are angles inclined in the second direction (Y-axis direction) with respect to the third direction (Z-axis direction).

The third lens unit 130 is located on the second lens unit 120. The lower surface of the third lens unit 130 may have a stepped shape corresponding to the stepped shape of the upper surface of the second lens unit 120. That is, the lower surface of the third lens unit 130 may include a fourth inclined surface 131 and may be formed in a stepped shape, and the fourth inclined surface 131 may have substantially the same inclination as the third inclined surface 122. The lower surface of the third lens unit 130 may be flat.

Because any one of the first polarizing mirrors 141, 142, 143, and 144 and any one of the second polarizing mirrors 151, 152, and 153 are not arranged in parallel in the second direction (Y-axis direction), the first and second inclined surfaces 111 and 121 and the third and fourth inclined surfaces 122 and 131 are also not arranged in the second direction (Y-axis direction).

The display device 200 is located over one side of the lens 100. The display device 200 displays a virtual image for realizing an augmented reality.

Figure 3:
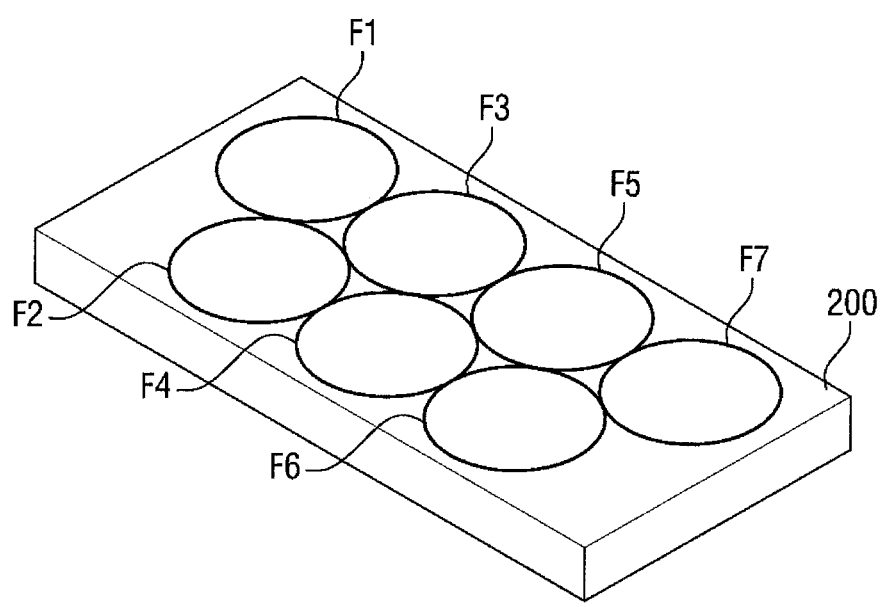
FIG. 3 is a perspective view showing an example of first to seventh areas in which first to seventh images are displayed in the display device of FIG. 1.
Figure 3:
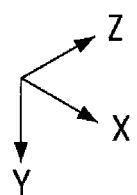
Figure 5:
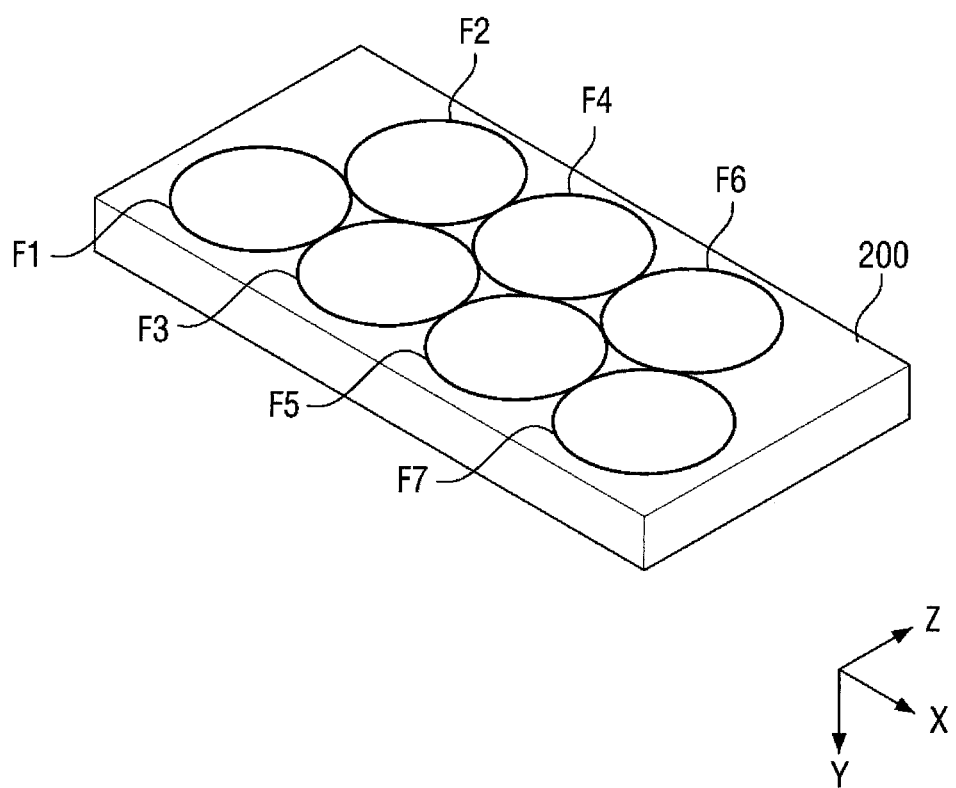
FIG. 5 is a perspective view showing an example of first to seventh areas in which first to seventh images are displayed in an display device according to some example embodiments.

The display device 200, as shown in FIGS. 3 and 5, displays first to seventh images IM1 to IM7 on first to seventh areas F1 to F7, respectively. That is, the first image IM1 is displayed on the first area F1 of the display device 200, the second image IM2 is displayed on the second area F2, the third image IM3 is displayed on the third area F3, the fourth image IM4 is displayed on the fourth area F4. Further, the fifth image IM5 is displayed on the fifth area F5 of the display device 200, the sixth image IM6 is displayed on the sixth area F6, and the seventh image IM7 is displayed on the seventh area F7.

The first polarizing mirrors 141, 142, 143, and 144 may be arranged to overlap the first, third, fifth and seventh areas F1, F3, F5, and F7 in the first direction (Y-axis direction), respectively, and the second polarizing mirrors 151, 152, and 153 may be arranged to overlap the second, fourth, and sixth areas F2, F4, and F6 in the first direction (Y-axis direction), respectively. For example, as shown in FIG. 2, the first polarizing mirrors 141, 142, 143 and 144 may be arranged closer to the user's eyes in the third direction (Z-axis direction) as compared with the second polarizing mirrors 151, 152 and 153. In this case, as shown in FIG. 3, the first, third, fifth, and seventh areas F1, F3, F5, and F7 may be arranged closer to the user's eyes in the third direction (Z-axis direction) as compared with the second, fourth, and sixth area F2, F4, and F6. Or, as shown in FIG. 4, the second polarizing mirrors 151, 152, and 153 may be arranged closer to the user's eyes in the third direction (Z-axis direction) as compared with the first polarizing mirrors 141, 142, 143, and 144, and in this case, as shown in FIG. 5, the second, fourth, and sixth areas F2, F4 and F6 of the display device 200 may be arranged closer to the user's eyes in the third direction (Z-axis direction) as compared with the first, third, fifth, and seventh areas F1, F3, F5, and F7.

Further, as shown in FIG. 2, the first polarizing mirrors 141, 142, 143 and 144 may be arranged closer to the display device 200 in the first direction (Y-axis direction) as compared with the second polarizing mirrors 151, 152 and 153. Or, as shown in FIG. 4, the second polarizing mirrors 151, 152 and 153 may be arranged closer to the display device 200 in the first direction (Y-axis direction) as compared with the first polarizing mirrors 141, 142, 143 and 144.

The display device 200 may be an organic light emitting display device or a liquid crystal display device. Further, as shown in FIGS. 12 to 14, when one side of the lens 100 is bent, the display device 200 may be a flexible display device. Hereinafter, for convenience of explanation, it is assumed that the display device 200 is an organic light emitting display device having flexibility.

The display device 200 includes a substrate, a thin film transistor layer located on the substrate, a light emitting element layer located on the thin film transistor layer, an encapsulation layer located on the light emitting element layer, a barrier film located on the encapsulation layer, a polarizing plate located on the barrier film.

The substrate may be formed of plastic or glass. When the substrate is formed of plastic, the substrate may include a flexible substrate and a supporting substrate, and the display device 200 may have flexibility as a flexible display device. The flexible substrate may be formed of a polyimide film, and the supporting substrate may be formed of polyethylene terephthalate (PET).

The thin film transistor layer is located on the substrate. The thin film transistor layer may include scan lines, data lines, and thin film transistors. Each of the thin film transistors includes a gate electrode, a semiconductor layer, and source and drain electrodes. When a scan driver is formed directly on the substrate, it may be formed together with the thin film transistor layer.

The light emitting element layer is located on the thin film transistor layer. The light emitting element layer includes anode electrodes, a light emitting layer, a cathode electrode, and banks. The light emitting layer may include an organic light emitting layer containing an organic material. For example, the light emitting layer may include a hole injection layer, a hole transporting layer, an organic light emitting layer, an electron transporting layer, and an electron injection layer. The hole injection layer and the electron injection layer may be omitted. When a voltage is applied to the anode electrode and the cathode electrode, holes and electrons move to the organic light emitting layer through the hole transporting layer and the electron transporting layer, respectively, and are combined with each other in the organic light emitting layer to emit light. The light emitting element layer may be a pixel array layer in which pixels are formed, and thus the area where the light emitting element layer is formed may be defined as a display area for displaying an image. The peripheral area of the display area may be defined as a non-display area.

The encapsulation layer is located on the light emitting element layer. The encapsulation layer serves to prevent or reduce the penetration of oxygen or moisture into the light emitting element layer. The encapsulating layer may include at least one inorganic film and at least one organic film.

The barrier film for encapsulating the display device 200 to protect it from oxygen or moisture is located on the encapsulation layer.

The polarizing plate 210 may be located between the display device 200 and the polarization control unit 300. Although it is illustrated in FIG. 1 that the polarizing plate 210 is located on one side of the display device 200 facing the polarization control unit 300, the polarizing plate 210 may be located on one side of the polarization control unit 300 facing the display device 200.

The polarizing plate 210 may have a light absorption axis that absorbs any one of first polarized light and second polarized light. For example, if the polarizing plate 210 has a light absorption axis that absorbs the second polarized light, light incident on the polarizing plate 210 may be linearly polarized into the first polarized light (↔) and output.

The polarization control unit 300 outputs an image output from the display device 200 as a first polarized light (↔) or a second polarized light (⊗). The polarization control unit 300 outputs a display image of the first polarized light (↔) inputted through the polarizing plate 210 as it is, or converts the display image into second polarized light (⊗) and outputs the second polarized light (⊗).

Figure 6A:
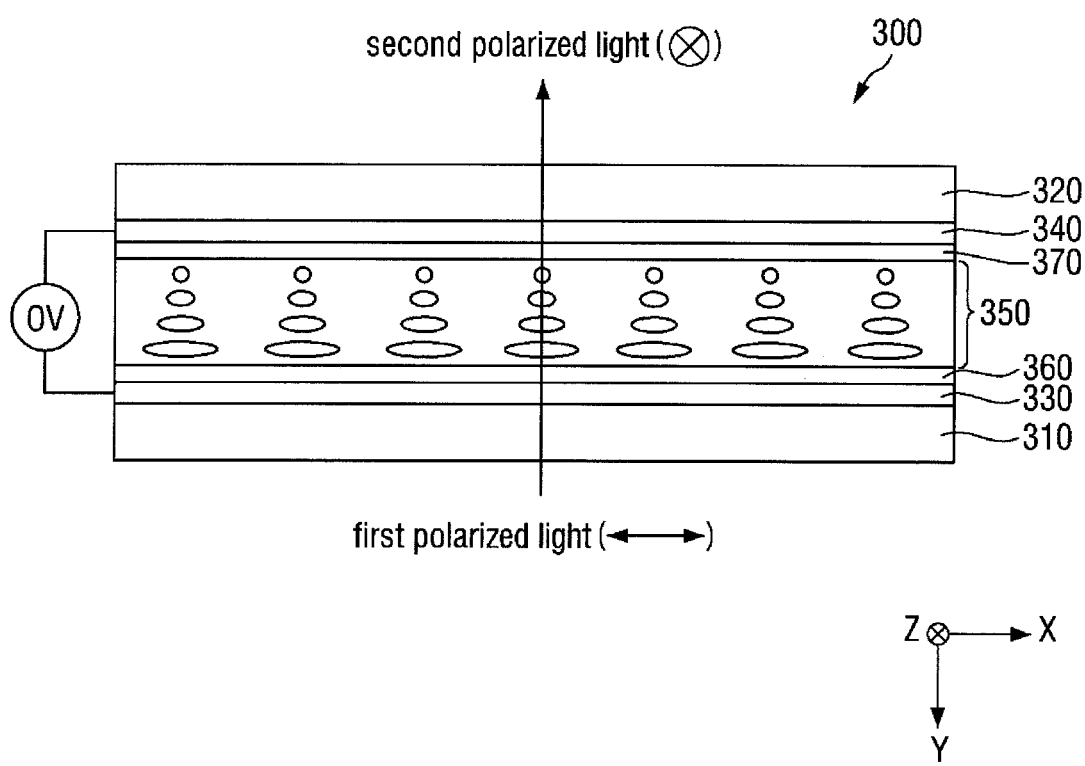
FIGS. 6A and 6B are example views showing a polarization control method of the polarization control unit of FIG. 1.
Figure 6B:
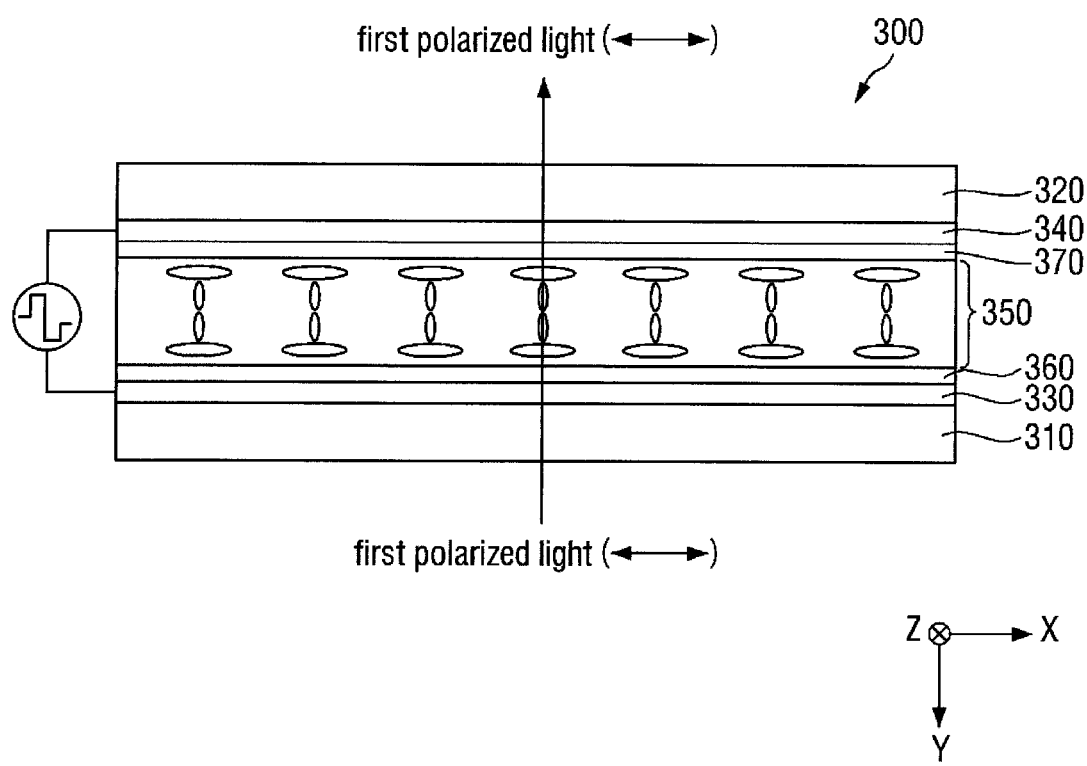

For example, as shown in FIGS. 6A and 6B, the polarization control unit 300 may be implemented as a liquid crystal panel. The polarization control unit 300, as shown in FIGS. 6A and 6B, may include a lower substrate 310, an upper substrate 320, a lower electrode 330, an upper electrode 340, and a liquid crystal layer 350.

Each of the lower substrate 310 and the upper substrate 320 may be formed of glass or plastic. The lower electrode 330 may be formed on one side of the lower substrate 310 facing the upper substrate 320, and the upper electrode 340 may be formed on one side of the upper substrate 320 facing the lower substrate 310. The lower electrode 330 and the upper electrode 340 may be formed of a transparent metal material such as indium tin oxide (ITO) or indium zinc oxide (IZO).

The liquid crystal layer 350 is located between the lower electrode 330 and the upper electrode 340. The liquid crystal layer 350 may include twisted nematic (TN) liquid crystals as shown in FIGS. 6A and 6B.

The liquid crystals of the liquid crystal layer 350 are pre-tilted by a lower alignment layer 360 formed on the lower electrode 330 and an upper alignment layer 370 formed on the upper electrode 340. The liquid crystals of the liquid crystal layer 350 may be arranged to rotate the first polarized light (↔) by 90° by the lower alignment layer 360 and the upper alignment layer 370 to convert the first polarized light (↔) into the second polarized light (⊗). Therefore, as shown in FIGS. 6A and 6B, when an electric field is not applied to the liquid crystal layer 350 by the lower electrode 330 and the upper electrode 340, the polarization control unit 300 may convert a display image of the first polarized light (↔) inputted through the polarizing plate 210 into second polarized light (⊗) and output the second polarized light (⊗). The case where an electric field is not applied to the liquid crystal layer 350 by the lower electrode 330 and the upper electrode 340 may include not only a case where a voltage of 0 V is applied to the lower electrode 330 and the upper electrode 340 as shown in FIG. 6A but also a case where a difference between the voltage applied to the lower electrode 330 and the voltage applied to the upper electrode 340 is smaller than a critical voltage.

The liquid crystals of the liquid crystal layer 350 may be arranged to transmit the first polarized light (↔) as it is when an electric field is applied to the liquid crystal layer 350 by the lower electrode 330 and the upper electrode 340. Therefore, when an electric field is applied to the liquid crystal layer 350 by the lower electrode 330 and the upper electrode 340 as shown in FIG. 6B, the display image of the first polarized light (↔) input through the polarizing plate 210 may be output as it is. The case where an electric field is applied to the liquid crystal layer 350 by the lower electrode 330 and the upper electrode 340 may include a case where a difference between the voltage applied to the lower electrode 330 and the voltage applied to the upper electrode 340 is a critical voltage or more.

The first adhesive layer 400 attaches the lens 100 and the polarization control unit 300 to each other. The second adhesive layer 500 attaches the polarization control unit 300 and the polarizing plate 210 located on one side of the display device 200. Each of the first adhesive layer 400 and the second adhesive layer 500 may be an optically clear resin (OCR) film or an optically clear adhesive (OCA) film.

As described above, according to the optical device 10 of an embodiment, an image of reality is provided to the user's eyes through the lens 100, and a virtual image output from the display device 200 may be provided to the user's eyes through first to fourth microlenses 410, 420, 430, and 440. That is, one image in which a virtual image is superimposed on an image of reality may be provided to the user's eyes.

Figure 7:
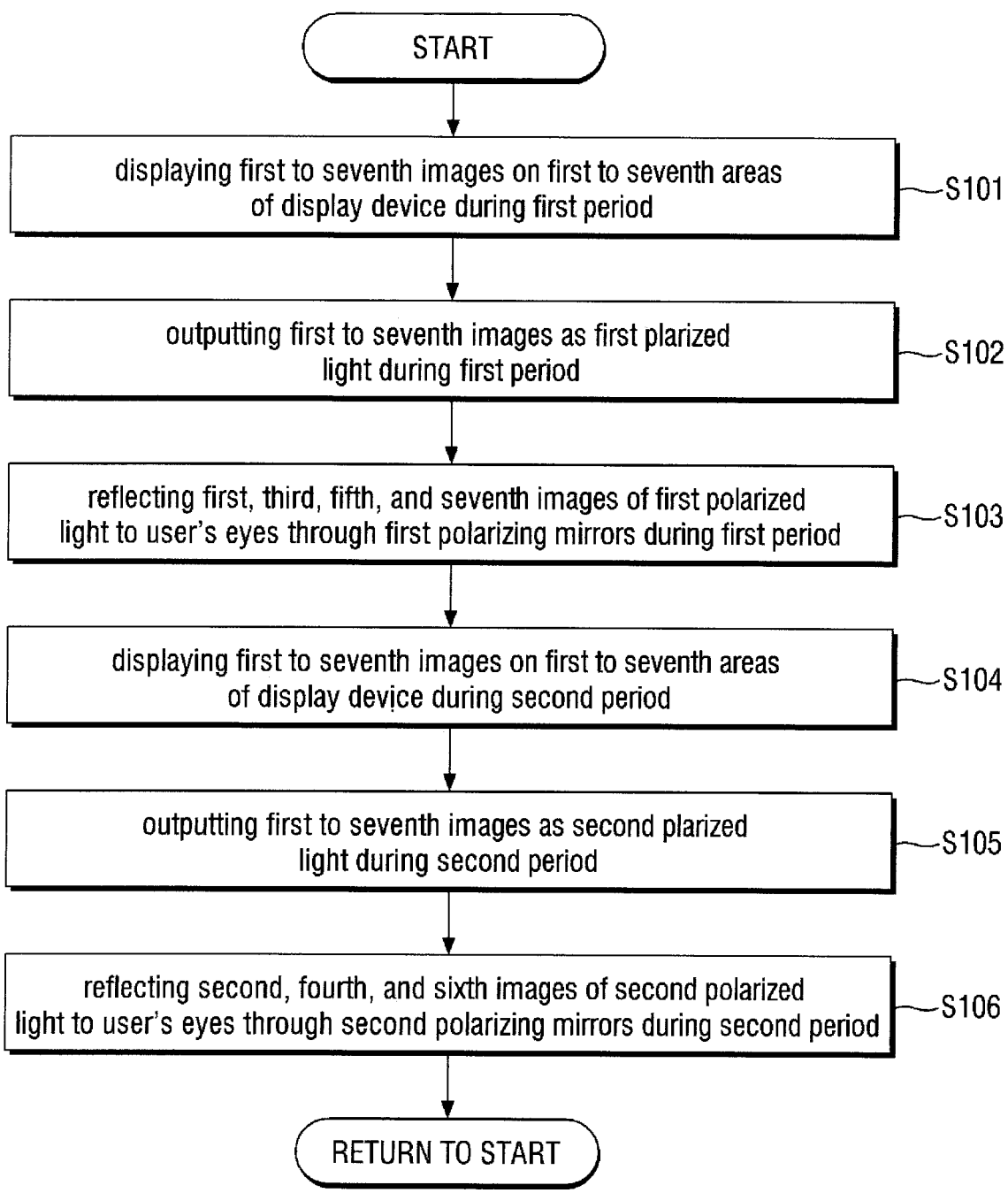
FIG. 7 is a flowchart showing a method of driving a optical device according to some example embodiments.

FIG. 7 is a flowchart showing a method of driving a optical device according to some example embodiments. For example, FIG. 7 is a flowchart showing a method of driving a optical device, in which the display device 200 is divided into seven areas F1 to F7 to display seven images IM1 to IM7, and the seven images IM1 to IM7 are provided to the user' eyes E using the seven first and second polarizing mirrors 141, 142, 143, 144, 151, 152, and 153.

First, the first to seventh images IM1 to IM7 are displayed on the first to seventh areas F1 to F7 of the display device 200 during the first period, respectively. (S101 in FIG. 7).

Figure 8A:
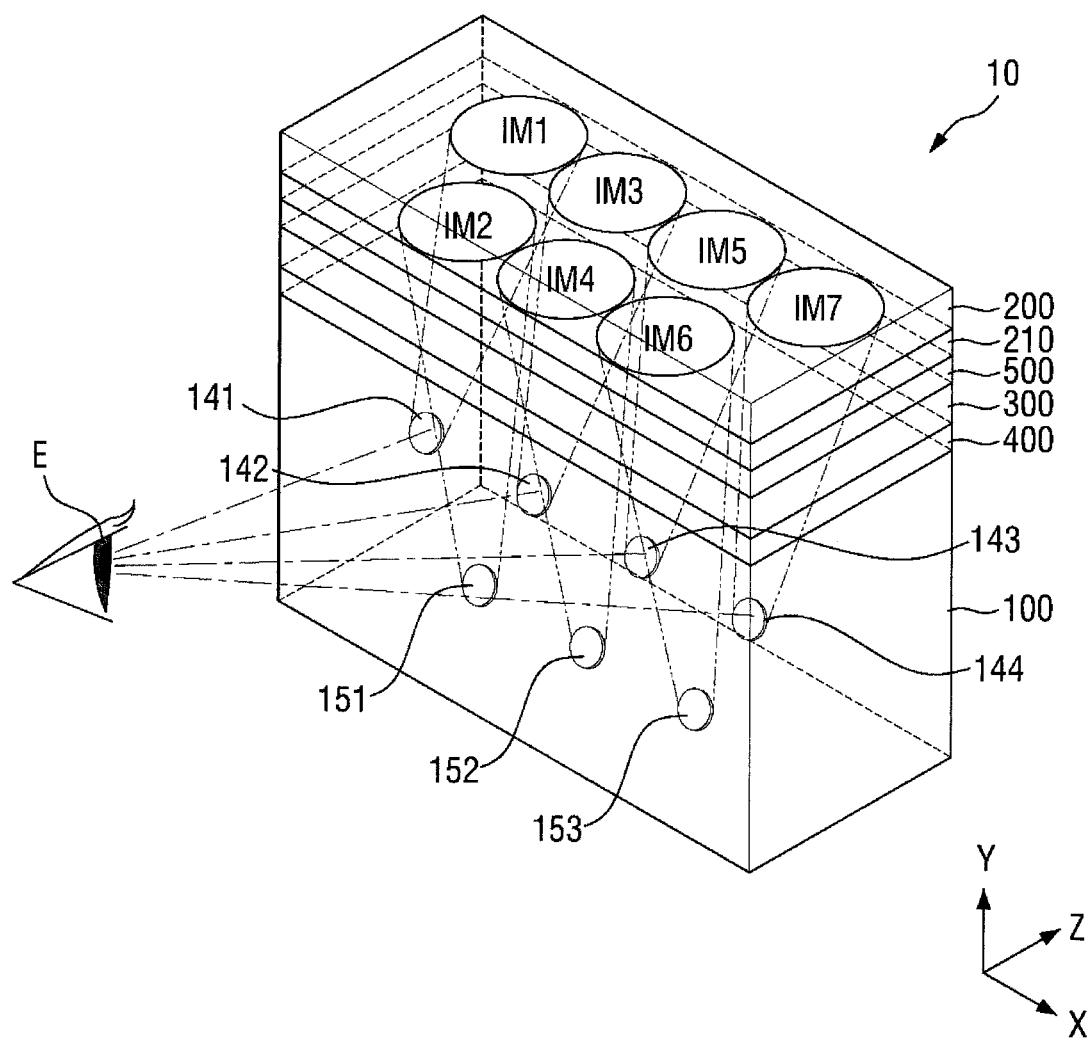
FIGS. 8A and 8B are perspective views showing a optical device for explaining a driving method during first and second periods of FIG. 7.
Figure 8B:
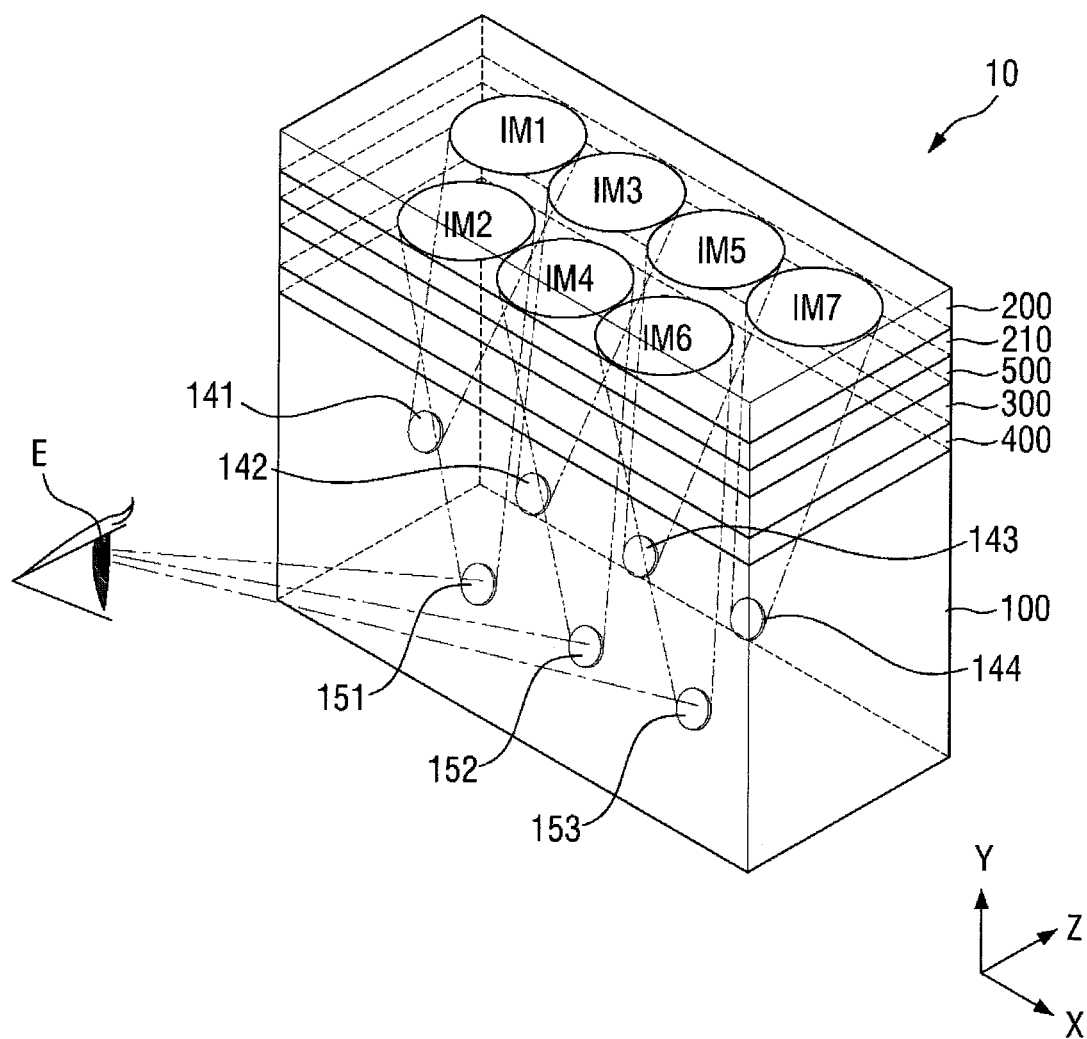

That is, as shown in FIG. 8A, the first image IM1 may be displayed on the first area F1 of the display device 200, the second image IM2 may be displayed on the second area F2, the third image F3 may be displayed on the third area F3, and the fourth image IM4 may be displayed on the fourth area F4. Further, the fifth image IM5 may be displayed on the fifth area F5 of the display device 200, the sixth image IM6 may be displayed on the sixth area F6, and the seventh image F7 may be displayed on the seventh area F7.

Second, the first to seventh images IM1 to IM7 of the display device 200 are output as first polarized light during the first period (S102 in FIG. 7).

For example, the first to seventh images IM1 to IM7 displayed on the first to seventh areas F1 to F7 of the display device 200 may be linearly polarized into first polarized light, and the first polarized light may be output. When an electric field is not applied to the liquid crystal layer 350 by the lower electrode 330 and the upper electrode 340 as shown in FIG. 6A, the polarization control unit 300 may output the first to seventh images IM1 to IM7 of the first polarized light (↔) inputted through the polarizing plate 210 without converting the first to seventh images IM1 to IM7.

Third, the first, third, fifth, and seventh images IM1, IM3, IM5, and IM7 of the first polarized light (↔) provided through the polarization control unit 300 are reflected to the user's eyes E through the first polarizing mirrors 141, 142, 143, and 144 during the first period (S103 in FIG. 7).

For example, each of the first polarizing mirrors 141, 142, 143, 144 may reflect the first polarized light and transmit the second polarized light, and each of the second polarizing mirrors 151, 152, and 153 may reflect the second polarized light and transmit the first polarized light. Therefore, as shown in FIGS. 8A and 9A, the first, third, fifth, and seventh images IM1, IM3, IM5, and IM7 of the first polarized light (↔) may be reflected by the first polarizing mirrors 141, 142, 143 and 144, and may be provided to the user's eyes E through the first side of the lens 100. However, the second, fourth, and sixth images IM2, IM4, and IM6 of the first polarized light (↔) are not reflected by the second polarizing mirrors 151, 152 and 153.

Fourth, the first to seventh images IM1 to IM7 are displayed on the first to seventh areas F1 to F7 of the display device 200 during the second period, respectively (S104 in FIG. 7).

Fifth, the first to seventh images IM1 to IM7 of the display device 200 are output as second polarized light (⊗) during the second period (S105 in FIG. 7).

For example, the first to seventh images IM1 to IM7 displayed on the first to seventh areas F1 to F7 of the display device 200 may be linearly polarized into first polarized light, and the first polarized light may be output. When an electric field is not applied to the liquid crystal layer 350 by the lower electrode 330 and the upper electrode 340 as shown in FIG. 6B, the polarization control unit 300 may convert the first to seventh images IM1 to IM7 of the first polarized light (↔) inputted through the polarizing plate 210 into second polarized light (⊗) and output the second polarized light (⊗).

Sixth, the second, fourth, and sixth images IM2, IM4, and IM6 of the second polarized light (⊗) provided through the polarization control unit 300 are reflected to the user's eyes E through the second polarizing mirrors 151, 152, and 153 during the second period (S106 in FIG. 7).

For example, each of the first polarizing mirrors 141, 142, 143, 144 may reflect the first polarized light and transmit the second polarized light, and each of the second polarizing mirrors 151, 152, and 153 may reflect the second polarized light and transmit the first polarized light. Therefore, as shown in FIGS. 8A and 9A, the first, third, fifth, and seventh images IM1, IM3, IM5, and IM7 of the second polarized light (⊗) are not reflected by the first polarizing mirrors 141, 142, 143 and 144. However, the second, fourth, and sixth images IM2, IM4, and IM6 of the second polarized light (⊗) may be reflected by the second polarizing mirrors 151, 152 and 153, and may be provided to the user's eyes E through the first side of the lens 100.

As described above, the user's eyes E may receive the first, third, fifth, and seventh images IM1, IM3, IM5, and IM7 of the first polarized light (↔) reflected by the first polarizing mirrors 141, 142, 143, and 144 during the first period, and may receive the second, fourth, and sixth images IM2, IM4, and IM6 of the second polarized light (⊗) reflected by the second polarizing mirrors 151, 152, and 153 during the second period. Accordingly, the user may see the first to seventh images IM1 to IM7 as shown in FIG. 10.

When a microdisplay such as OLEDoS (Organic Light Emitting Diode on Silicon) or LCOS (Liquid Crystal on Silicon) is used as the display device 200, in order to enlarge an area of a display device, that is, a field of view (FOV) of a user, which is visible to the user, a plurality of display devices 200 may be located on one side of the lens 100. In this case, images displayed by the plurality of display devices 200 may be separately seen to the user due to the space between the plurality of display devices 200. Further, because the plurality of display devices 200 are driven separately, the plurality of display devices 200 may be synchronized, so that driving may be more complicated. In addition, in the case of OLEDoS, because a color filter is formed on the organic light emitting layer that emits white light to realize a color, it is difficult to realize high brightness.

In contrast, the optical device 10 according to another embodiment includes one display device 200 located on one side of the lens 100, and provides images displayed on one display device 200 to the user's eyes by using the first and second polarized mirrors 141, 142, 143, 144, 151 152, and 153. Thus, according to the optical device 10 of another embodiment, the field of view (FOV) of the user may be easily enlarged, a virtual image is not separately seen to the user, and it is not required to synchronize and drive the plurality of display devices 200. Further, when the display device 200 of the optical device 10 according to another embodiment uses red, green, and blue organic light emitting layers, the realization of high brightness may be improved as compared to OLEDoS because no color filter is required.

Figure 10:
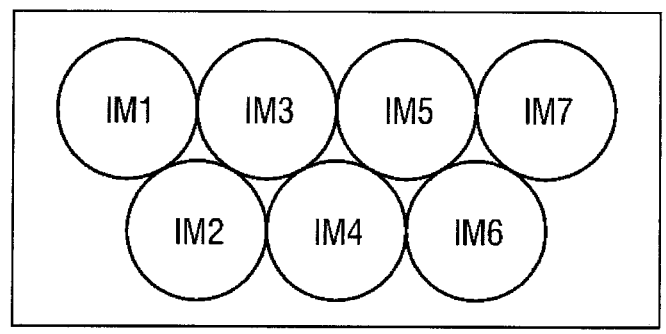
FIG. 10 is an example view showing an example of an image of a display device seen to a user according to the driving method of FIG. 7.

Meanwhile, FIGS. 7 to 10 illustrate a case where the first to seventh areas F1 to F7 of the display device 200, the first polarizing mirrors 141, 142, 143, and 144, and the second polarizing mirrors 151, 152, and 153 are arranged as shown in FIGS. 2 and 3. In this case, as shown in FIG. 10, the user may see the first, third, fifth, and seventh images IM1, IM3, IM5, and IM7, displayed above, and the second, fourth, and sixth images IM2, IM4, and IM6, described below. However, when the first to seventh areas F1 to F7 of the display device 200, the first polarizing mirrors 141, 142, 143, and 144, and the second polarizing mirrors 151, 152, and 153 are arranged as shown in FIGS. 4 and 5, the user may seen the second, fourth, and sixth images IM2, IM4, and IM6, displayed above, and the first, third, fifth, and seventh images IM1, IM3, IM5, and IM7, displayed below, as shown in FIG. 11.

Figure 11:
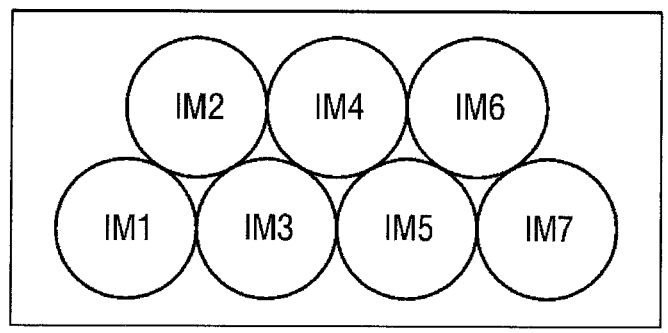
FIG. 11 is an example view showing another example of an image of a display device seen to a user according to the driving method of FIG. 7.

Further, as shown in FIGS. 10 and 11, the first to seventh images IM1 to IM7 seen to the user may be in contact with each other, but the present invention is not limited thereto. For example, the first to seventh images IM1 to IM7 seen to the user may overlap each other or may be spaced apart from each other. That is, the image seen to the user by the optical device 10 according to some example embodiments may be changed depending on the arrangement positions of the first to seventh areas F1 to F7 of the display device 200, the first polarizing mirrors 141, 142, 143, and 144, and the second polarizing mirrors 151, 152, and 153 and the inclined angles of the first polarizing mirrors 141, 142, 143, and 144, and the second polarizing mirrors 151, 152, and 153.

Figure 15:
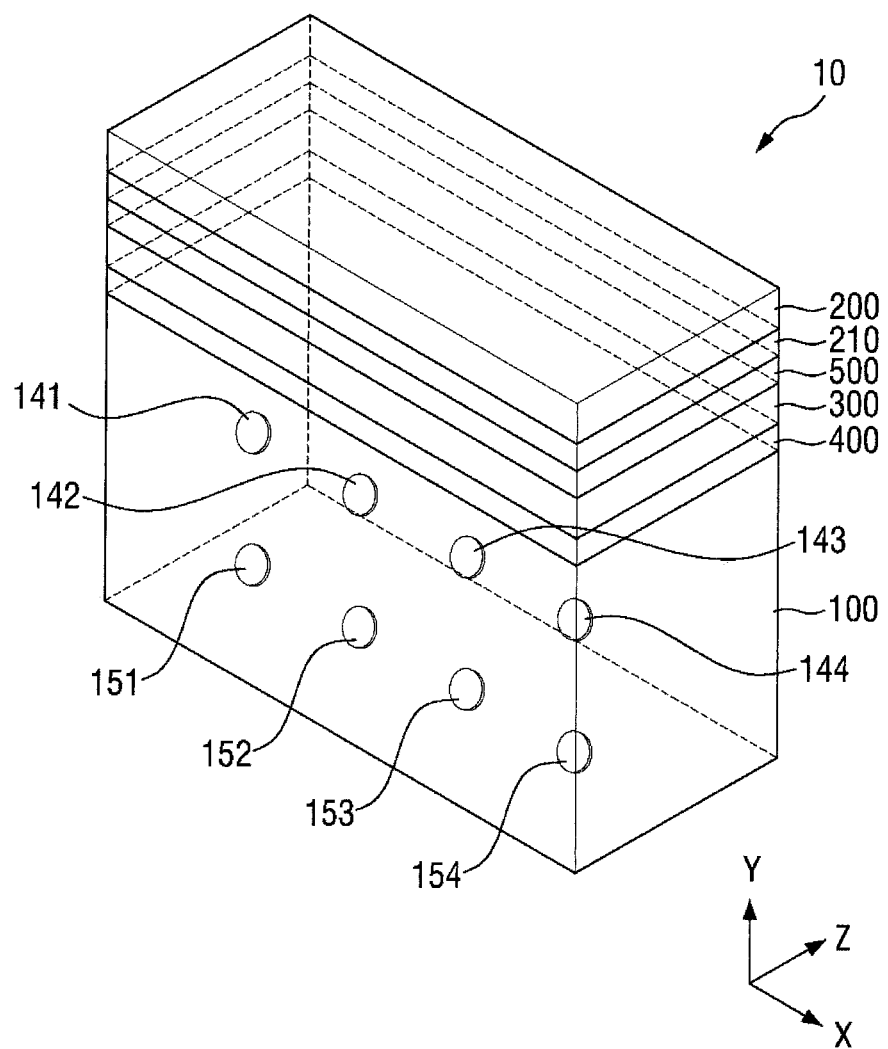
FIG. 15 is a perspective view of a optical device according to some example embodiments.

FIG. 15 is a perspective view of a optical device according to some example embodiments.

Referring to FIG. 15, a optical device 10 according to some example embodiments includes a lens 100, a display device 200, a polarizing plate 210, a polarization control unit 300, a first adhesive layer 400, and a second adhesive layer 500.

The optical device 10 shown in FIG. 15 is substantially the same as the optical device 10 shown in FIG. 1, except that the first polarizing mirrors 141, 142, 143, and 144 and the second polarizing mirrors 151, 152, 153, and 154 are arranged in parallel in the first direction (Y-axis direction), respectively. Therefore, some repetitive description of the optical device 10 shown in FIG. 1 will be omitted.

Figure 16:
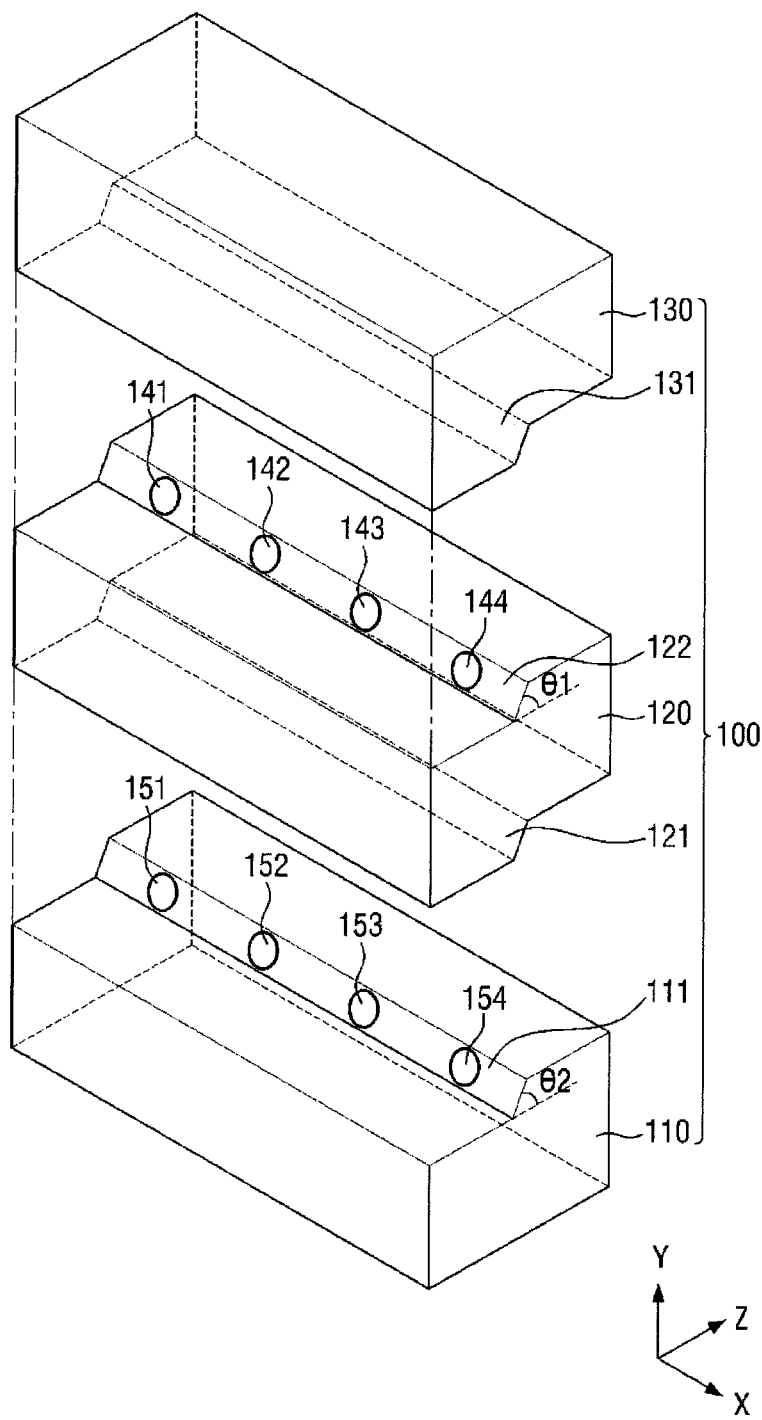
FIG. 16 is a perspective view showing an example of a lens including first and second polarization mirrors of FIG. 15.

As shown in FIG. 16, the lens 100 may include a plurality of lens units 110, 120, and 130. The upper surface of the first lens unit 110 may include a first inclined surface 111 and may be formed in a stepped shape. The second polarizing mirrors 151, 152, 153, and 154 may be located on the first inclined surface 111 to be inclined at a second angle θ2. The second angle θ2 may be appropriately set according to the display device 200, the second polarizing mirror 151/152/153/154, and the angle formed by the user's eye. The lower surface of the first lens unit 110 may be flat.

Figure 21A:
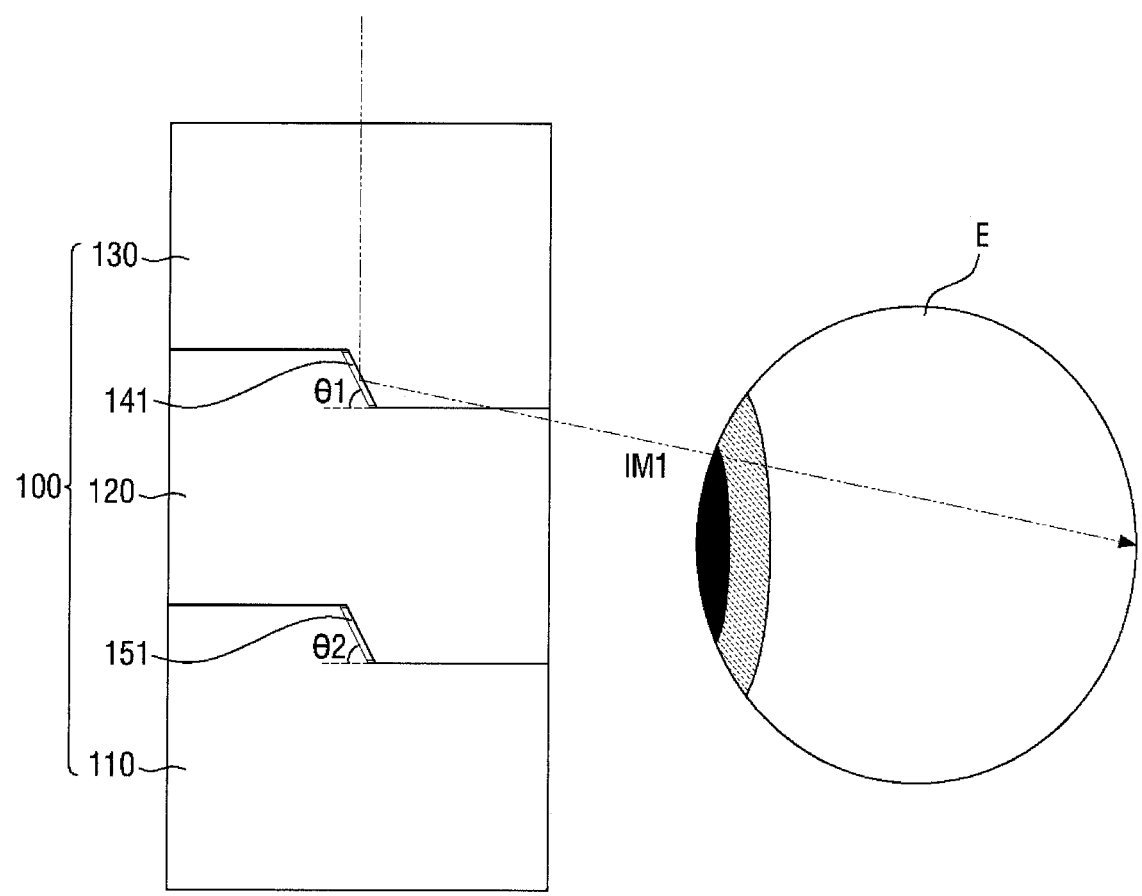
FIGS. 21A and 21B are side views showing an example of a lens for explaining a driving method during first and second periods of FIG. 19.
Figure 21B:
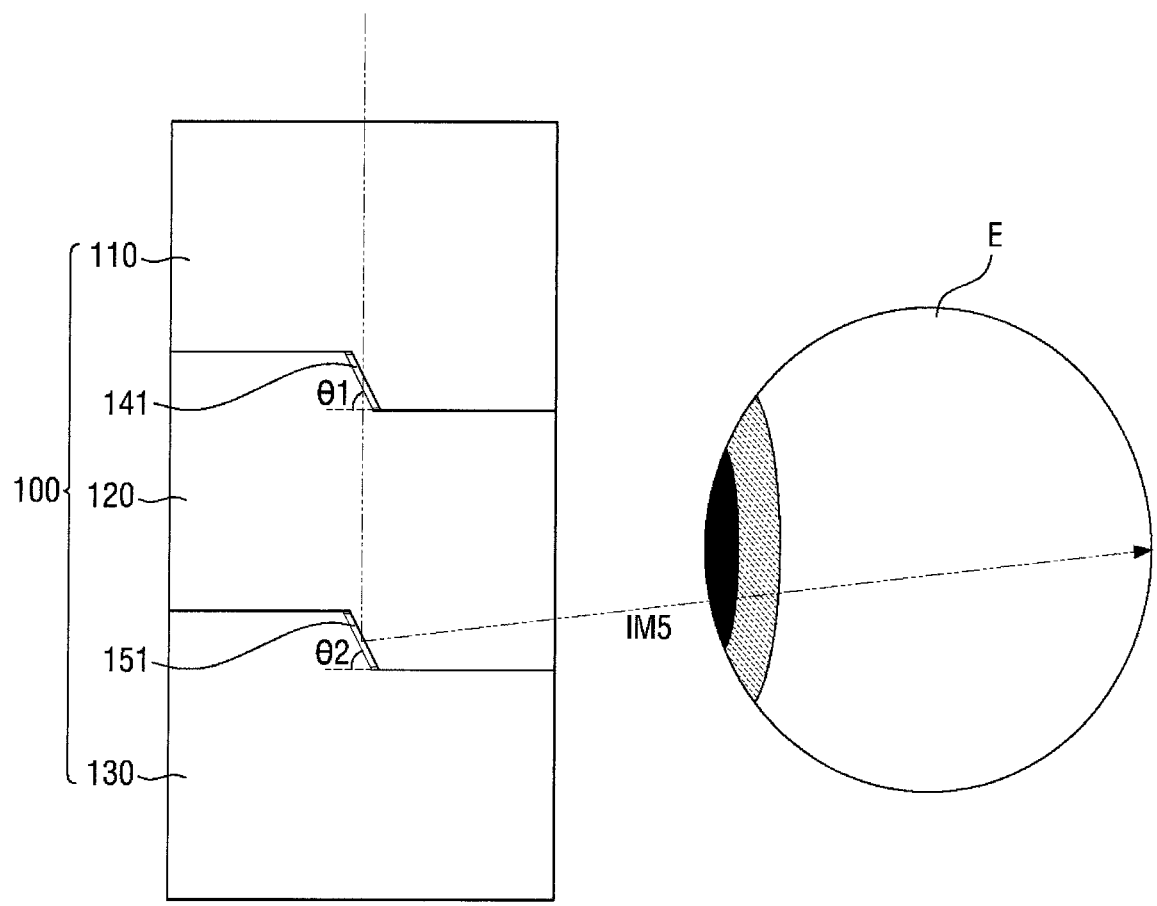

The second lens unit 120 is located on the first lens unit 110. The lower surface of the second lens unit 120 may have a stepped shape corresponding to the stepped shape of the upper surface of the first lens unit 110. That is, the lower surface of the second lens unit 120 may include a second inclined surface 121 and may be formed in a stepped shape, and the second inclined surface 121 may have substantially the same inclination as the first inclined surface 111. The upper surface of the second lens unit 120 may include a third inclined surface 122 and may be formed in a stepped shape. The first polarizing mirrors 141, 142, 143, and 144 may be located on the third inclined surface 122 to be inclined at a first angle θ1. The first angle θ1 may be appropriately set according to the display device 200, the first polarizing mirror 141/142/143/144, and the angle formed by the user's eye. For example, as shown in FIGS. 21A and 21B, the inclined angle θ1 of the first polarizing mirror 141/142/143/144 may be larger than the inclined angle θ2 of the second polarizing mirror 151/152/153/154.

The third lens unit 130 is located on the second lens unit 120. The lower surface of the third lens unit 130 may have a stepped shape corresponding to the stepped shape of the upper surface of the second lens unit 120. That is, the lower surface of the third lens unit 130 may include a fourth inclined surface 131 and may be formed in a stepped shape, and the fourth inclined surface 131 may have substantially the same inclination as the third inclined surface 122. The lower surface of the third lens unit 130 may be flat.

Because the first polarizing mirrors 141, 142, 143, and 144 and the second polarizing mirrors 151, 152, 153 and 154 are arranged in parallel in the second direction (Y-axis direction), the first and second inclined surfaces 111 and 121 and the third and fourth inclined surfaces 122 and 131 are also arranged in the second direction (Y-axis direction).

The display device 200 is located over one side of the lens 100. The display device 200 displays a virtual image for realizing an augmented reality.

Figure 18:
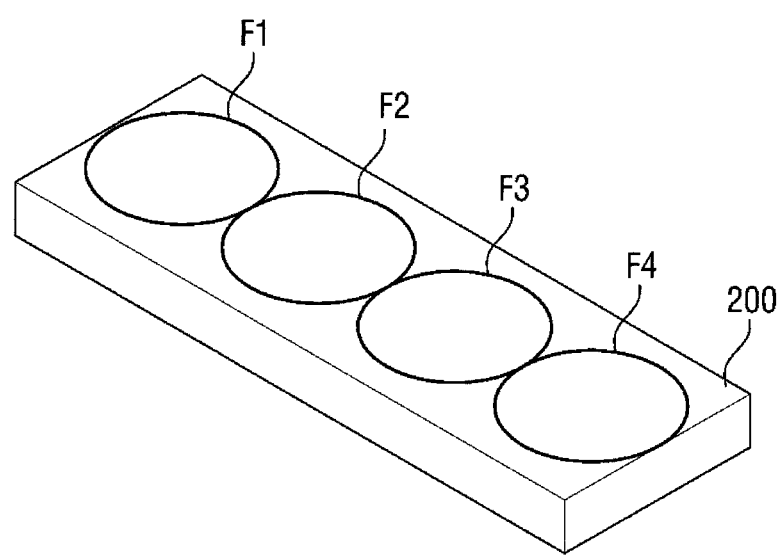
FIG. 18 is a perspective view showing an example of first to fourth areas of the display device of FIG. 15.

The display device 200, as shown in FIG. 18, displays first to fourth images IM1 to IM4 or fifth to eighth IM5 to IM8 on first to fourth areas F1 to F4, respectively. That is, the first image IM1 is displayed on the first area F1, the second image IM2 is displayed on the second area F2, the third image IM3 is displayed on the third area F3, and the fourth image IM4 is displayed on the fourth area F4. Further, the fifth image IM5 is displayed on the fifth area F5, the sixth image IM6 is displayed on the sixth area F6, the seventh image IM7 is displayed on the seventh area F7, and the eighth image IM8 is displayed on the eighth area F8.

Figure 17:
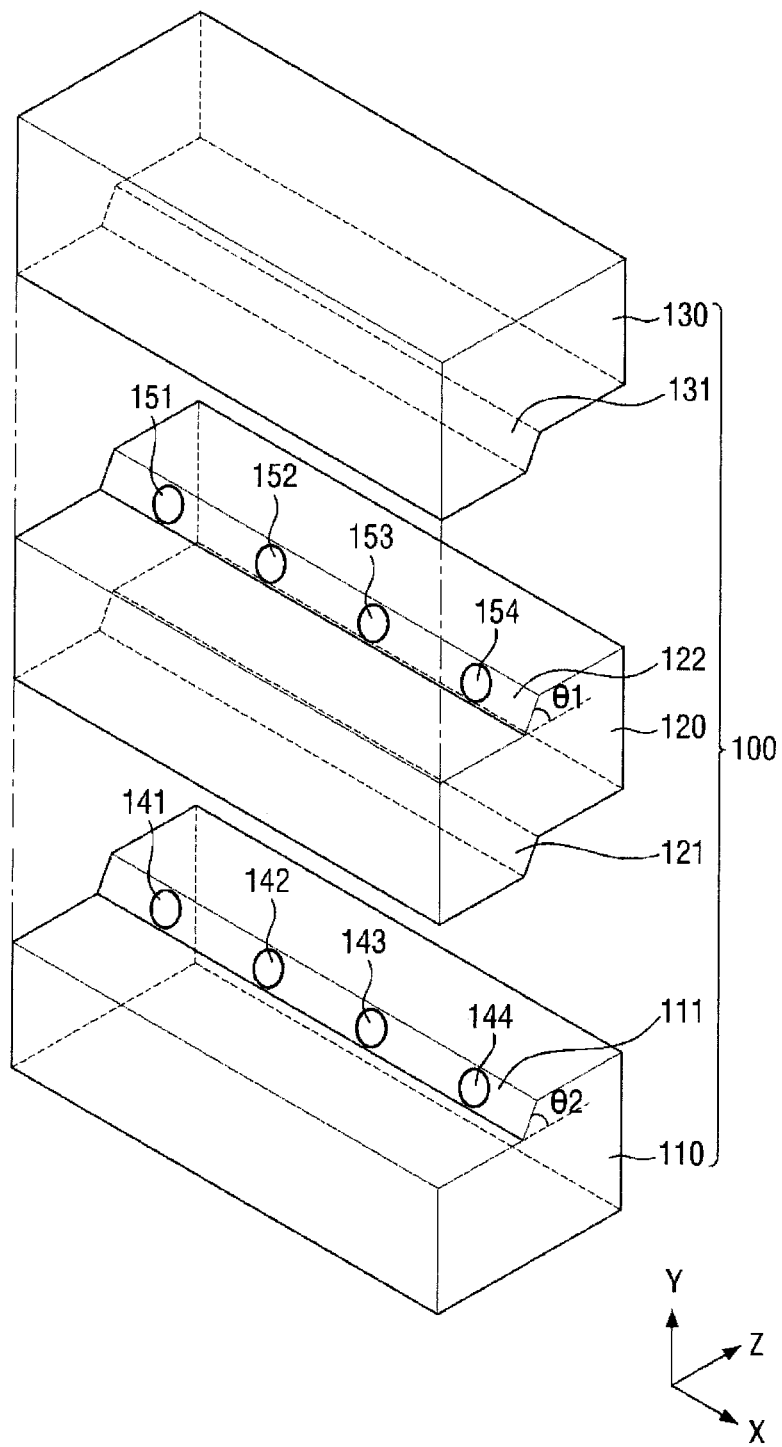
FIG. 17 is a perspective view showing another example of a lens including first and second polarization mirrors of FIG. 15.

The first polarizing mirrors 141, 142, 143, and 144 and the second polarizing mirrors 151, 152, 153, and 154 may be arranged to overlap the first to fourth areas F1 to F4 in the first direction (Y-axis direction), respectively. Further, as shown in FIG. 16, the first polarizing mirrors 141, 142, 143, and 144 and the second polarizing mirrors 151, 152, 153, and 154 may be arranged closer to the display device 200 in the first direction (Y-axis direction) as compared with the second polarizing mirrors 151, 152, 153 and 154. Or, as shown in FIG. 17, the second polarizing mirrors 151, 152, 153, and 154 may be arranged closer to the display device 200 in the first direction (Y-axis direction) as compared with the first polarizing mirrors 141, 142, 143, and 14.

Meanwhile, although it is illustrated in FIG. 15 that the lens 100 is formed in a hexahedron having first and second rectangular surfaces and first to fourth side surfaces, the lens 100 may be formed in various other shapes. For example, as shown in FIG. 12, the lens 100 may be formed in a decahedron having first and second octagonal surfaces and first to eighth side surfaces. That is, the lens 100 according to an embodiment may be formed in a polyhedron having first and second polygonal surfaces and side surfaces. Further, as shown in FIG. 13, the lens 100 may be formed in a cylinder having first and second circular surfaces and a side surface. Further, as shown in FIG. 14, the lens 100 may be formed in a cylinder having first and second elliptical surfaces and a side surface. In FIGS. 1 and 12 to 14, the first surface may be defined as a surface on which the user's eye is located, and the second surface may be defined as an outer surface of the lens 100. The lens 100 may be formed in other shapes in addition to the polyhedron and cylindrical shapes shown in FIGS. 1 and 12 to 14.

Figure 19:
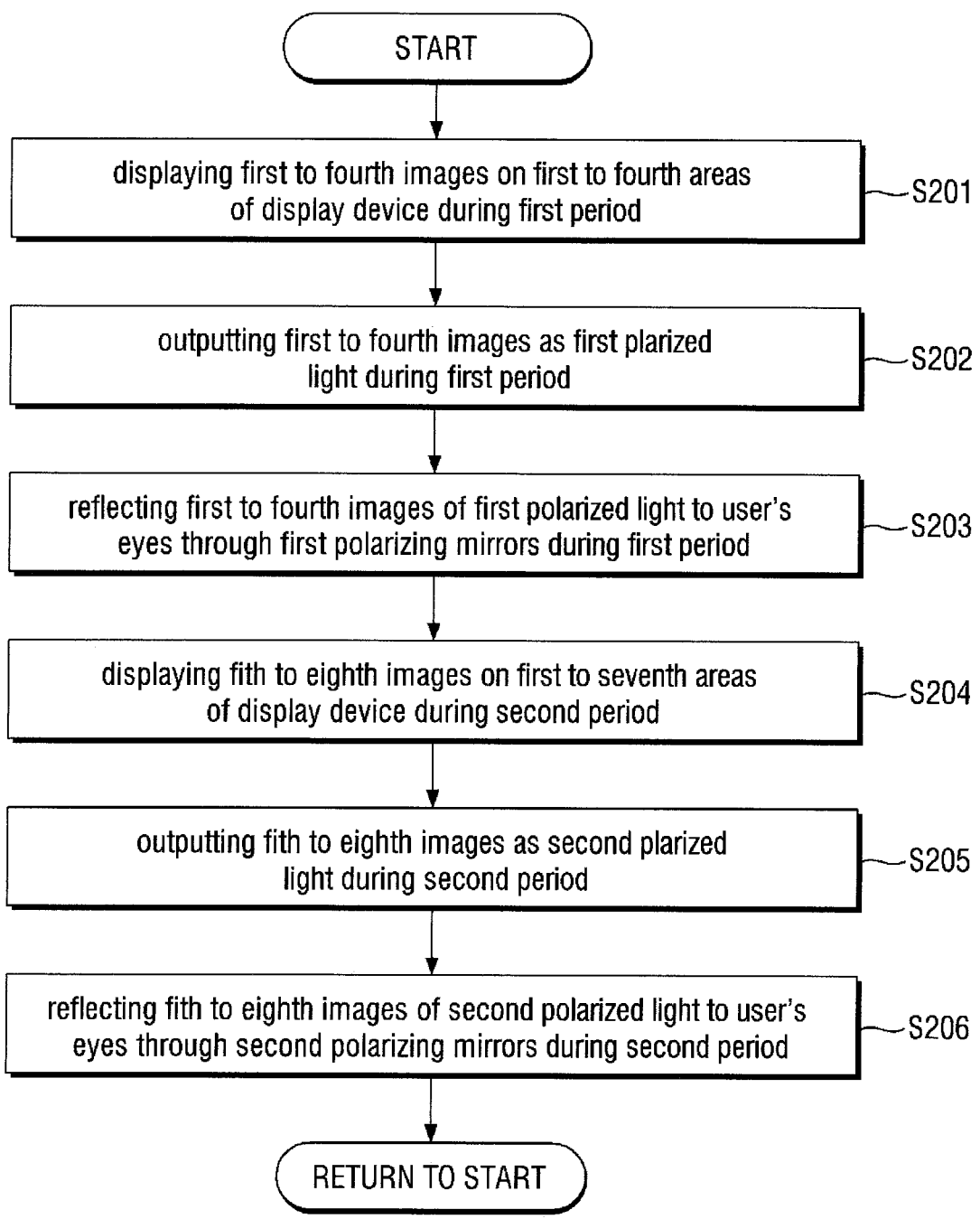
FIG. 19 is a flowchart showing a method of driving a optical device according to some example embodiments.

FIG. 19 is a flowchart showing a method of driving a optical device according to some example embodiments.

For example, FIG. 19 is a flowchart showing a method of driving a optical device, in which the display device 200 is divided into four areas F1 to F4 to display eight images IM1 to IM8, and the eight images IM1 to IM7 are provided to the user' eyes E using the eight first and second polarizing mirrors 141, 142, 143, 144, 151, 152, 153, and 154.

First, the first to fourth images IM1 to IM4 are displayed on the first to fourth areas F1 to F4 of the display device 200 during the first period, respectively. (S201 in FIG. 19).

Figure 20A:
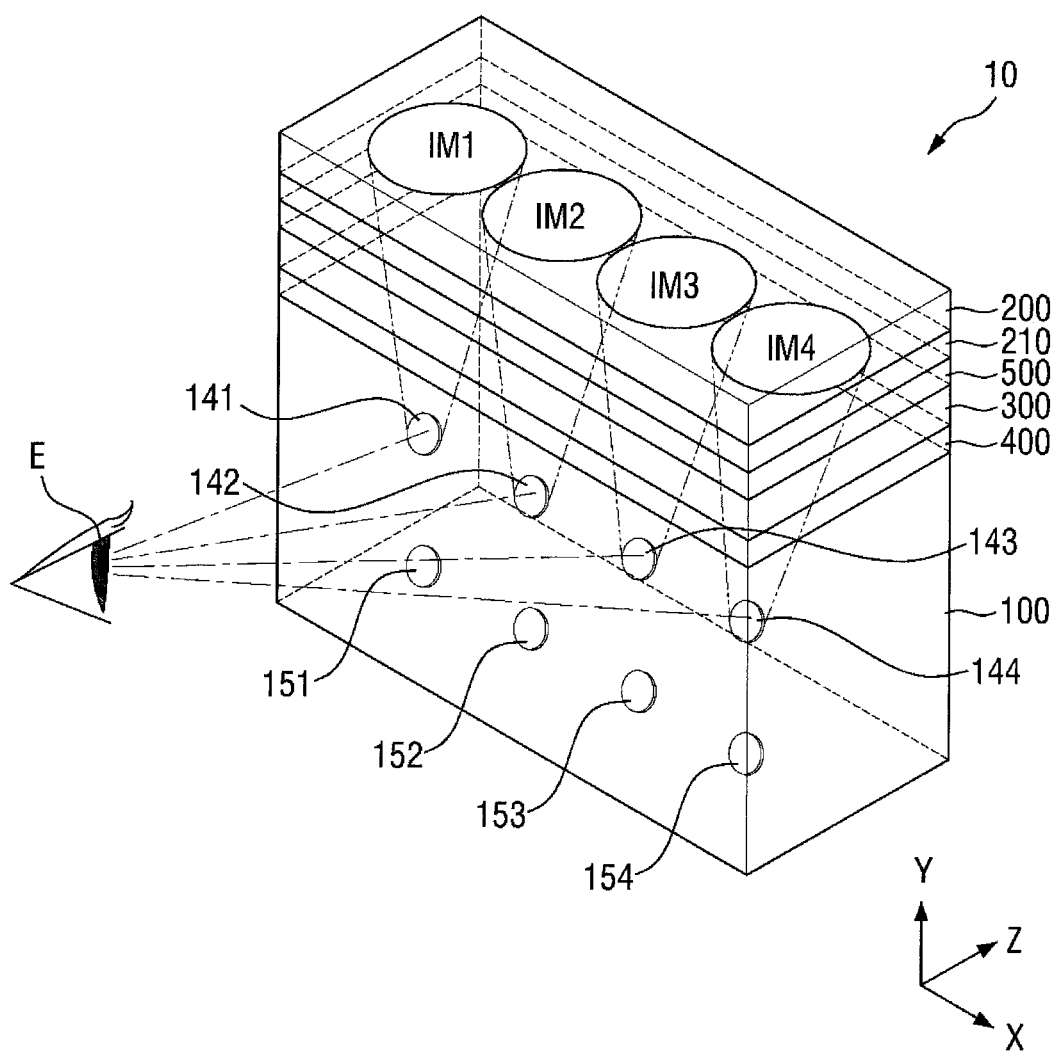
FIGS. 20A and 20B are perspective views showing a optical device for explaining a driving method during first and second periods of FIG. 19.

That is, as shown in FIG. 20A, the first image IM1 may be displayed on the first area F1 of the display device 200, the second image IM2 may be displayed on the second area F2, the third image F3 may be displayed on the third area F3, and the fourth image IM4 may be displayed on the fourth area F4.

Second, the first to fourth images IM1 to IM4 of the display device 200 are output as first polarized light during the first period (S202 in FIG. 19).

For example, the first to fourth images IM1 to IM4 displayed on the first to fourth areas F1 to F4 of the display device 200 may be linearly polarized into first polarized light, and the first polarized light may be output. When an electric field is not applied to the liquid crystal layer 350 by the lower electrode 330 and the upper electrode 340 as shown in FIG. 6A, the polarization control unit 300 may output the first to fourth images IM1 to IM4 of the first polarized light ($\leftrightarrow$) inputted through the polarizing plate 210 without converting the first to fourth images IM1 to IM4.

Third, the first to fourth images IM1 to IM4 of the first polarized light ($\leftrightarrow$) provided through the polarization control unit 300 are reflected to the user's eyes E through the first polarizing mirrors 141, 142, 143, and 144 during the first period (S203 in FIG. 19).

For example, each of the first polarizing mirrors 141, 142, 143, 144 may reflect the first polarized light and transmit the second polarized light, and each of the second polarizing mirrors 151, 152, 153, and 154 may reflect the second polarized light and transmit the first polarized light. Therefore, as shown in FIGS. 20A and 21A, the first to fourth images IM1 to IM4 of the first polarized light ($\leftrightarrow$) may be reflected by the first polarizing mirrors 141, 142, 143 and 144, and may be provided to the user's eyes E through the first side of the lens 100. Further, although some of the first to fourth images IM1 to IM4 of the first polarized light ($\leftrightarrow$) are transmitted by the first polarizing mirrors 141, 142, 143 and 144 without being reflected, they are not reflected by the second polarizing mirrors 151, 152, 153, and 154.

Fourth, the fifth to eighth images IM5 to IM8 are displayed on the first to fourth areas F1 to F4 of the display device 200 during the second period, respectively (S204 in FIG. 19).

Fifth, the fifth to eighth images IM5 to IM8 of the display device 200 are output as second polarized light ($\otimes$) during the second period (S205 in FIG. 19).

For example, the fifth to eighth images IM5 to IM8 displayed on the first to fourth areas F1 to F4 of the display device 200 may be linearly polarized into first polarized light, and the first polarized light may be output. When an electric field is not applied to the liquid crystal layer 350 by the lower electrode 330 and the upper electrode 340 as shown in FIG. 6B, the polarization control unit 300 may convert the fifth to eighth images IM5 to IM8 of the first polarized light ($\leftrightarrow$) inputted through the polarizing plate 210 into second polarized light ($\otimes$) and output the second polarized light ($\otimes$).

Sixth, the fifth to eighth images IM5 to IM8 of the second polarized light ($\otimes$) provided through the polarization control unit 300 are reflected to the user's eyes E through the second polarizing mirrors 151, 152, 153, and 154 during the second period (S206 in FIG. 19).

Figure 20B:
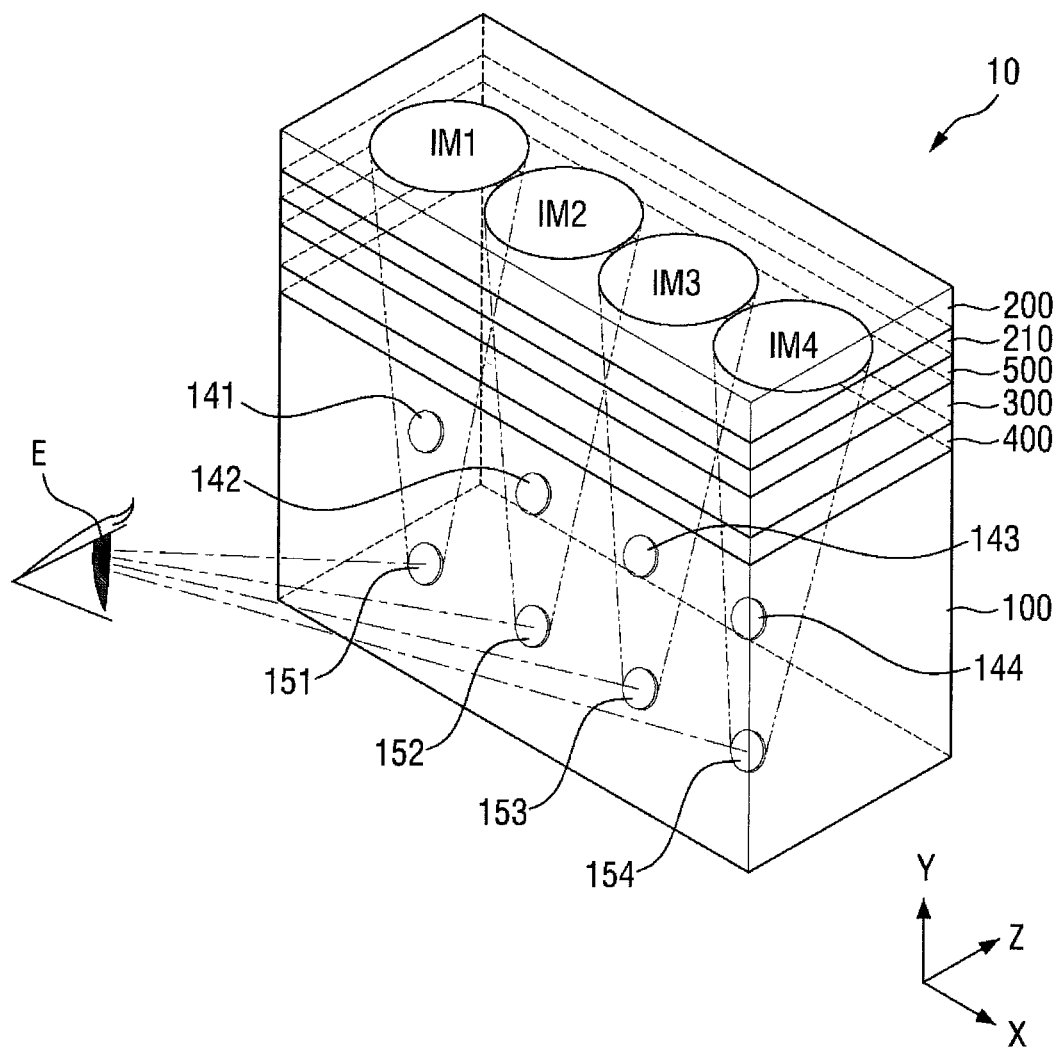

For example, each of the first polarizing mirrors 141, 142, 143, 144 may reflect the first polarized light and transmit the second polarized light, and each of the second polarizing mirrors 151, 152, 153, and 154 may reflect the second polarized light and transmit the first polarized light. Therefore, as shown in FIGS. 20B and 21B, the 151, 152, 153, and 154 of the second polarized light ($\otimes$) are transmitted by the first polarizing mirrors 141, 142, 143 and 144 without being reflected. Then, the fifth to eighth images IM5 to IM8 of the second polarized light ($\otimes$), having passed through the first polarizing mirrors 141, 142, 143, 144, may be reflected by the second polarizing mirrors 151, 152 153 and 154, and may be provided to the user's eyes E through the first side of the lens 100.

Figure 22:
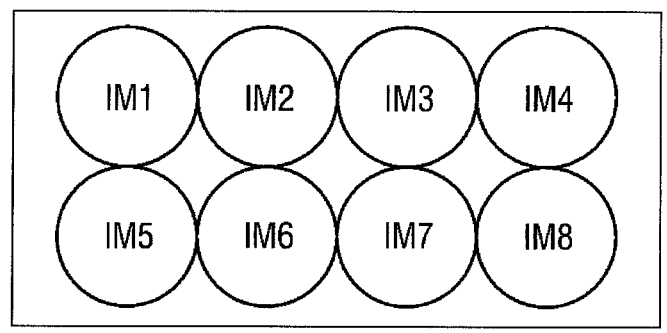
FIG. 22 is an example view showing an example of an image of a display device seen to a user according to the driving method of FIG. 19.

As described above, the user's eyes E may receive the first to fourth images IM1 to IM4 of the first polarized light ($\leftrightarrow$) reflected by the first polarizing mirrors 141, 142, 143, and 144 during the first period, and may receive the fifth to eighth images IM5 to IM8 of the second polarized light ($\otimes$) reflected by the second polarizing mirrors 151, 152, 153, and 154 during the second period. Accordingly, the user may see the first to eight images IM1 to IM8 as shown in FIG. 22.

When a microdisplay such as OLEDoS (Organic Light Emitting Diode on Silicon) or LCOS (Liquid Crystal on Silicon) is used as the display device 200, in order to enlarge an area of a display device, that is, a field of view (FOV) of a user, which is visible to the user, a plurality of display devices 200 is required to be located on one side of the lens 100. In this case, images displayed by the plurality of display devices 200 may be separately seen to the user due to the space between the plurality of display devices 200. Further, because the plurality of display devices 200 are driven separately, the plurality of display devices 200 need to be synchronized, so that driving becomes complicated. In addition, in the case of OLEDoS, because a color filter is formed on the organic light emitting layer that emits white light to realize a color, it is difficult to realize high brightness.

In contrast, the optical device 10 according to some example embodiments includes one display device 200 located on one side of the lens 100, and provides images displayed on one display device 200 to the user's eyes by using the first and second polarized mirrors 141, 142, 143, 144, 151 152, 153, and 154. Thus, according to the optical device 10 of another embodiment, the field of view (FOV) of the user may be easily enlarged, an virtual image is not separately seen to the user, and it is not required to synchronize and drive the plurality of display devices 200. Further, when the display device 200 of the optical device 10 according to some example embodiments may use red, green, and blue organic light emitting layers, the realization of high brightness may be possible as compared to OLEDoS because no color filter is required.

Further, in the optical device 10 according to still another embodiment, the first polarizing mirrors 141, 142, 143 and 144 and the second polarizing mirrors 151, 152, 153, and 154 are arranged in parallel along the first direction (Y-axis direction), respectively, and the image of the same area of the display device 200 is divided using the polarization controller 300 and is provided to the first polarizing mirrors 141, 142, 143 and 144 and the second polarizing mirrors 151, 152, 153, and 154. As a result, because the optical device 10 shown in FIG. 15 additionally provides the eighth image IM8 to the user as compared with the optical device shown in FIG. 1, the field of view (FOV) of the user may be further enlarged.

Meanwhile, FIGS. 19 to 22 illustrate a case where the first polarizing mirrors 141, 142, 143, and 144 are arranged closer to the display device 200 in the first direction (Y-axis direction) as compared with the second polarizing mirrors 151, 152, 153, and 154 are arranged as shown in FIG. 16. In this case, as shown in FIG. 22, the user may see the first to fourth images IM1 to IM4, displayed above, and the fifth to eighth images IM5 to IM8, described below. However, when the second polarizing mirrors 151, 152, 153, and 154 are arranged closer to the display device 200 in the first direction (Y-axis direction) as compared with the first polarizing mirrors 141, 142, 143, and 144 as shown in FIG. 17, the user may see the fifth to eighth images IM5 to IM8, displayed above, and the first to fourth images IM1 to IM4, described below, as shown in FIG. 23.

Figure 23:
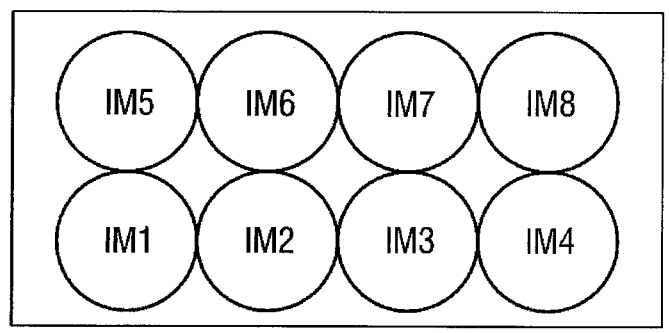
FIG. 23 is an example view showing another example of an image of a display device seen to a user according to the driving method of FIG. 19.

Further, as shown in FIGS. 22 and 23, the first to eighth images IM1 to IM8 seen to the user may be in contact with each other, but the present invention is not limited thereto. For example, the first to eighth images IM1 to IM8 seen to the user may overlap each other or may be spaced apart from each other. That is, the image seen to the user by the optical device 10 according to an embodiment may be changed depending on the arrangement positions of the first to eighth areas F1 to F8 of the display device 200, the first polarizing mirrors 141, 142, 143, and 144, and the second polarizing mirrors 151, 152, 153, and 154 and the inclined angles of the first polarizing mirrors 141, 142, 143, and 144, and the second polarizing mirrors 151, 152, 153 and 154.

Figure 24:
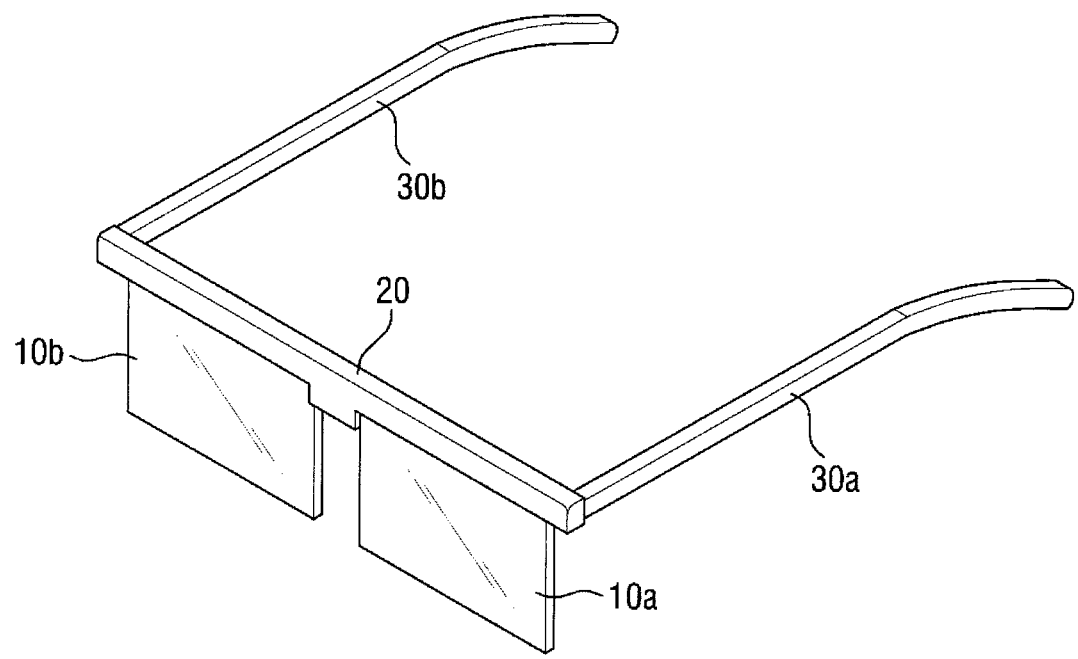
FIG. 24 is an example view of a head-mounted display including a optical device according to some example embodiments.

FIG. 24 is an example view of a head-mounted display (HMD) including a optical device according to various embodiments.

FIG. 24 shows that a optical device may be applied to a head mounted display (HMD). The head mounted display (HMD) according to an embodiment includes a first augmented reality providing device 10a, a second augmented reality providing device 10b, a support frame 20, and eyeglass frame legs 30a and 30b.

Although it is illustrated in FIG. 24 that the head mounted display (HMD) is implemented in the form of an eyeglass including the eyeglass frame legs 30a and 30b, each of the eyeglass frame legs 30a and 30b may include a head mounting band that can be attached to the head.

Application examples of the optical device are not limited to those shown in FIG. 24, and the optical device may be applied to various electronic apparatuses in various forms.

As described above, according to the optical device of some example embodiments, it may be possible to enlarge an area of a display device, that is, a field of view (FOV) of a user, which is visible to the user, while using one display.

The effects of the present invention are not limited by the foregoing, and other various effects are anticipated herein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although aspects of some example embodiments of the present invention have been disclosed for illustrative purposes, those skilled in the art will appreciate that various modifications, additions and substitutions are possible, without departing from the scope and spirit of the invention as disclosed in the accompanying claims, and their equivalents.

What is claimed is:

1. A optical device, comprising:
a display device configured to output a display image;
a lens on one side of the display device; and
a polarization control unit between the display device and the lens and configured to output the display image output from the display device as first polarized light or second polarized light,
wherein the lens comprises:
a first polarizing mirror configured to reflect a display image of the first polarized light and to transmit a display image of the second polarized light; and
a second polarizing mirror configured to reflect a display image of the second polarized light and to transmit a display image of the first polarized light.

2. The optical device of claim 1,
wherein the display device comprises:
a first area configured to display a first display image; and
a second area configured to display a second display image.

3. The optical device of claim 2,
wherein the polarization control unit is configured to output first and second display images of the first polarized light during a first period, and to output first and second display images of the second polarized light during a second period.

4. The optical device of claim 1,
wherein the first polarizing mirror is closer to the display device as compared with the second polarizing mirror.

5. The optical device of claim 1,
wherein the lens further comprises:
another first polarizing mirror spaced from the first polarizing mirror in parallel in the second direction; and another second polarizing mirror spaced from the second polarizing mirror in parallel in the second direction to.

6. The optical device of claim 5, wherein the display device includes a first area configured to display a first display image, a second area configured to display a second display image, a third area configured to display a third display image, and a fourth area configured to display a fourth display image.

7. The optical device of claim 6, wherein the polarization control unit is configured to output the first to fourth display images of the first polarized light during a first period, and to output the first to fourth display images of the second polarized light during a second period.

8. The optical device of claim 1, wherein the display device is configured to display a first display image during a first period, and to display a second display image during a second period.

9. The optical device of claim 8, wherein the polarization control unit is configured to output a first display image of the first polarized light during the first period, and to output a second display image of the second polarized light.

10. The optical device of claim 1, wherein the first polarizing mirror and the second polarizing mirror are arranged in parallel to each other in a first direction which is a height direction of the lens.

11. The optical device of claim 1, wherein the first polarizing mirror is closer to the display device as compared with the second polarizing mirror.

12. The optical device of claim 1, wherein the lens further comprises:
another first polarizing mirror spaced from the first polarizing mirror in parallel in a second direction which is a width direction of the lens; and
another second polarizing mirror spaced from the second polarizing mirror in parallel in the second direction.

13. The optical device of claim 12, wherein the display device includes a first area configured to display a first display image during a first period and to display a fifth display image during a second period, and a second area configured to display a second display image during the first period and to display a sixth display image during the second period.

14. The optical device of claim 13, wherein the polarization control unit is configured to output first and second display images of the first polarized light during the first period, and to output fifth and sixth display images of the second polarized light during the second period.

15. The optical device of claim 1, wherein each of the first polarizing mirror and the second polarizing mirror comprises a reflective polarizing film.

16. The optical device of claim 1, further comprising:
a polarizing plate between the display device and the polarization control unit and outputting a display image of the first polarized light.

17. The optical device of claim 1, wherein the first polarized light is p-polarized light (horizontal polarized light), and the second polarized light is s-polarized light (vertical polarized light).

18. The optical device of claim 1, wherein the polarization control unit comprises:
first and second substrates;
a first electrode on one side of the first substrate;
a second electrode on one side of the second substrate facing the first substrate; and
a liquid crystal layer between the first electrode and the second electrode.

19. A method of driving a optical device, comprising:
displaying first and second images on first and second areas of a display device during a first period, respectively;
outputting the first and second images as first polarized light during the first period;
reflecting a first image of the first polarized light through a first polarizing mirror during the first period;
displaying the first and second images on the first and second areas of the display device during a second period, respectively;
outputting the first and second images as second polarized light during the second period; and
reflecting a second image of the second polarized light through a second polarizing mirror during the second period.

20. A method of driving a optical device, comprising:
displaying a first image on a first area of a display device during a first period;
outputting the first image as first polarized light during the first period;
reflecting a first image of the first polarized light through a first polarizing mirror during the first period;
displaying a fifth image on the first area of the display device during a second period;
outputting the fifth image as second polarized light during the second period; and
reflecting a fifth image of the second polarized light through a second polarizing mirror during the second period.

* * * * *